(12) United States Patent
Elshormbably et al.

(10) Patent No.: US 12,395,109 B2
(45) Date of Patent: Aug. 19, 2025

(54) PREDICTIVE CURRENT CONTROL METHOD FOR A SIX-PHASE INDUCTION MOTOR

(71) Applicant: KING FAHD UNIVERSITY OF PETROLEUM AND MINERALS, Dhahran (SA)

(72) Inventors: Mohamed Mamdouh Mohamed Elshormbably, Dhahran (SA); Mohamed Ali Yousef Abido, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 174 days.

(21) Appl. No.: 18/498,753

(22) Filed: Oct. 31, 2023

(65) Prior Publication Data
US 2025/0141380 A1   May 1, 2025

(51) Int. Cl.
*H02P 21/22*   (2016.01)
*H02P 21/18*   (2016.01)
(Continued)

(52) U.S. Cl.
CPC .............. *H02P 21/22* (2016.02); *H02P 21/18* (2016.02); *H02P 25/107* (2013.01); *H02P 27/06* (2013.01)

(58) Field of Classification Search
CPC ...... H02P 21/18; H02P 21/22; H02P 2207/01; H02P 25/107; H02P 27/06; H02P 21/00;
(Continued)

(56) References Cited

U.S. PATENT DOCUMENTS

| 11,119,457 B2 | 9/2021 | El Shormbably et al. |
| 2020/0409320 A1 | 12/2020 | El Shormbably et al. |

(Continued)

FOREIGN PATENT DOCUMENTS

| CN | 107565872 A | 1/2018 |
| CN | 109347389 A | 2/2019 |
| CN | 115037213 A | 9/2022 |

OTHER PUBLICATIONS

Osvaldo Gonzalez, et al., "Model Predictive Current Control of Six-Phase Induction Motor Drives Using Virtual Vectors and Space Vector Modulation", IEEE Transactions on Power Electronics, vol. 37, Issue 7, Jan. 7, 2022, pp. 7617-7628 (Abstract only).

*Primary Examiner* — Antony M Paul
(74) *Attorney, Agent, or Firm* — Oblon, McClelland, Maier & Neustadt, L.L.P.

(57) ABSTRACT

A predictive current control method for a six-phase induction motor (6PIM) includes initializing a six-phase inverter at a present switching state, measuring a stator current and a rotor speed, transforming the stator current to $\alpha\beta$ and xy orthogonal frame, estimating a pair of currents in $\alpha\beta$ and xy frame based upon the measured and an estimated rotor speed, and calculating a future stator current for a future control sample of the inverter. The method further includes selecting four voltage vectors (VV) from $\alpha\beta$ and xy frames, implementing a cost function to calculate an error between the predicted future and a reference stator current, calculating a plurality of cost function results of each of the four VV, identifying a future VV that provides a minimum cost function results for the future control sample, saving the future VV to be used as an input to the lookup table for the next control sample and controlling the 6PIM by applying the future control sample as the switching state of the inverter.

14 Claims, 30 Drawing Sheets

(51) Int. Cl.
*H02P 25/10* (2006.01)
*H02P 27/06* (2006.01)

(58) Field of Classification Search
CPC ............. H02P 21/0003; H02P 21/0021; H02P 21/0085; H02P 21/14; H02P 21/34; H02P 21/50; H02P 21/30; H02P 23/07; H02P 27/08; H02P 25/062
See application file for complete search history.

(56) References Cited

U.S. PATENT DOCUMENTS

2021/0344292 A1\* 11/2021 Sahin ................ H02M 7/53873
2023/0006582 A1\* 1/2023 Wang ................. H02M 1/0009

\* cited by examiner

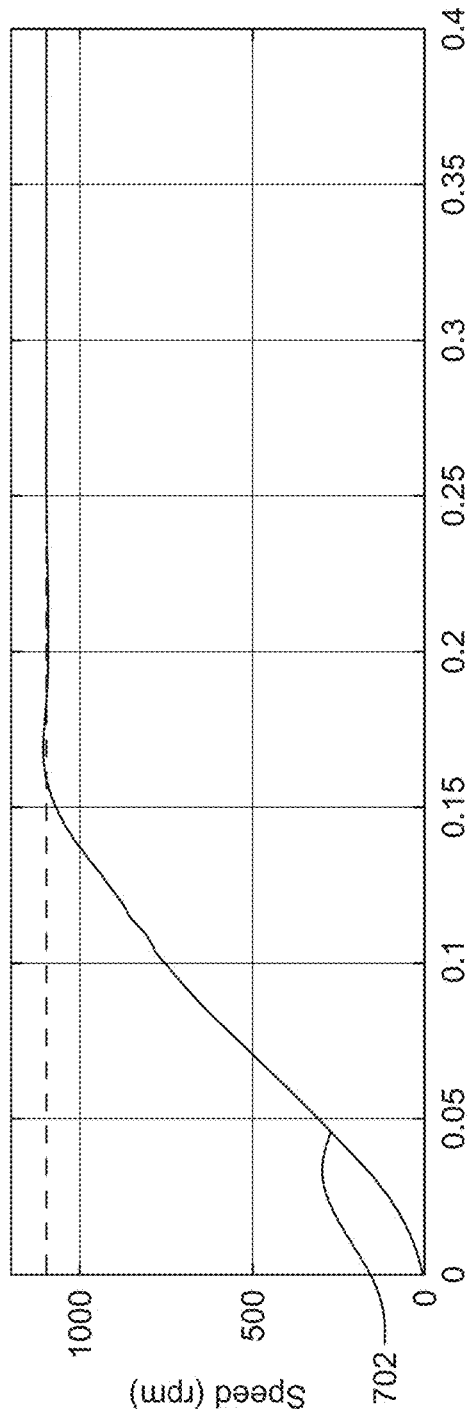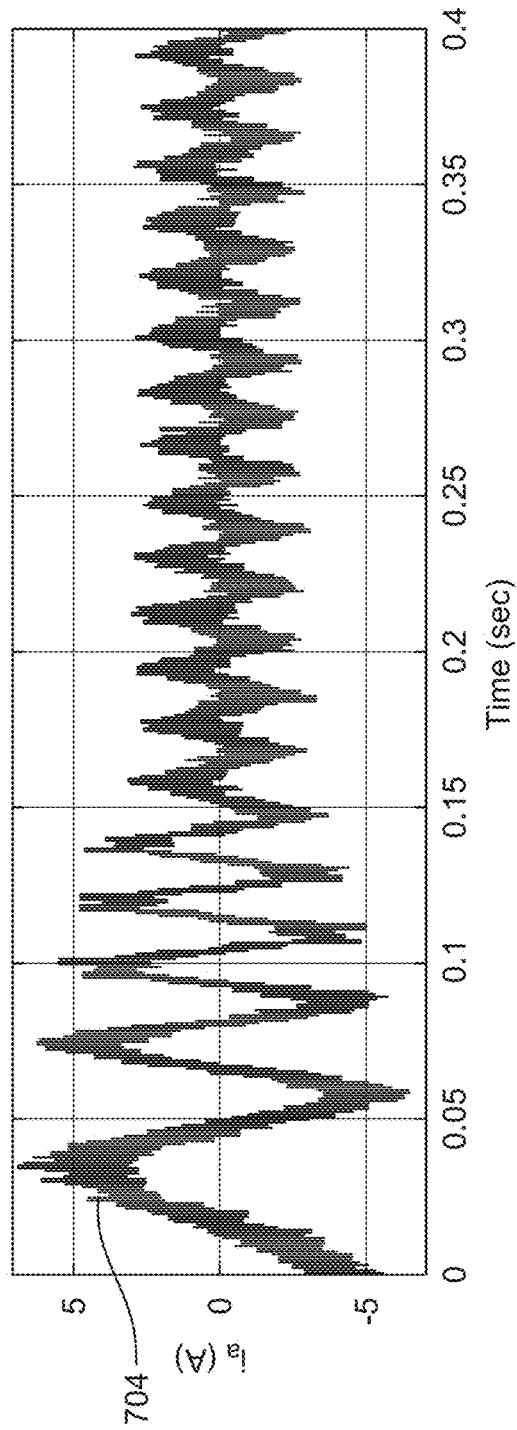
FIG. 7A
FIG. 7B

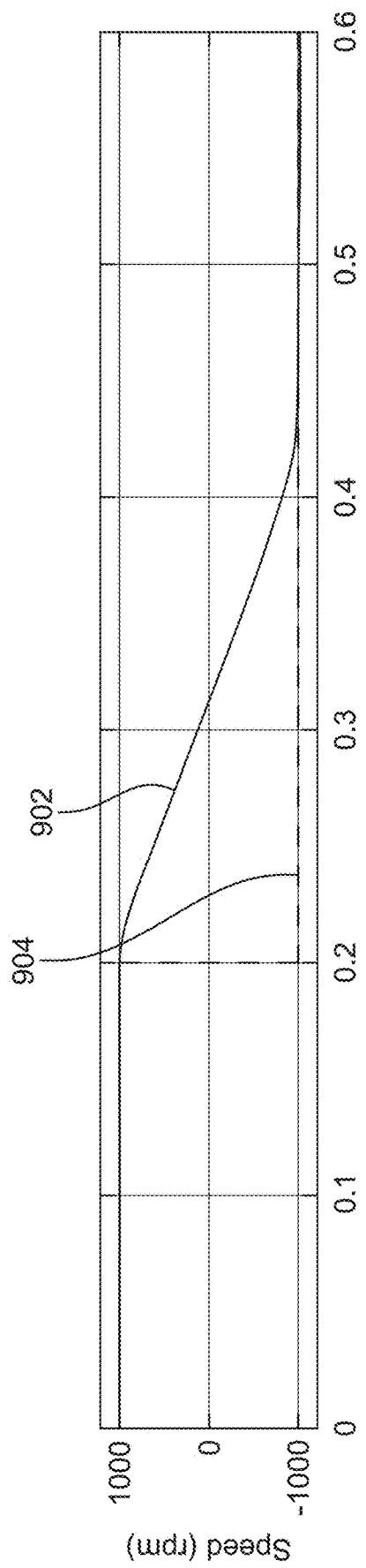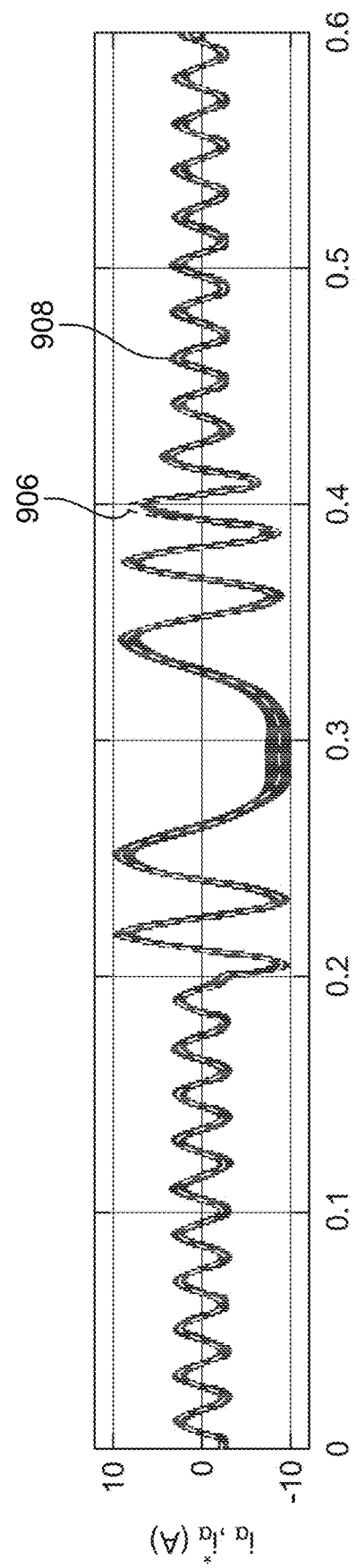
FIG. 9A
FIG. 9B

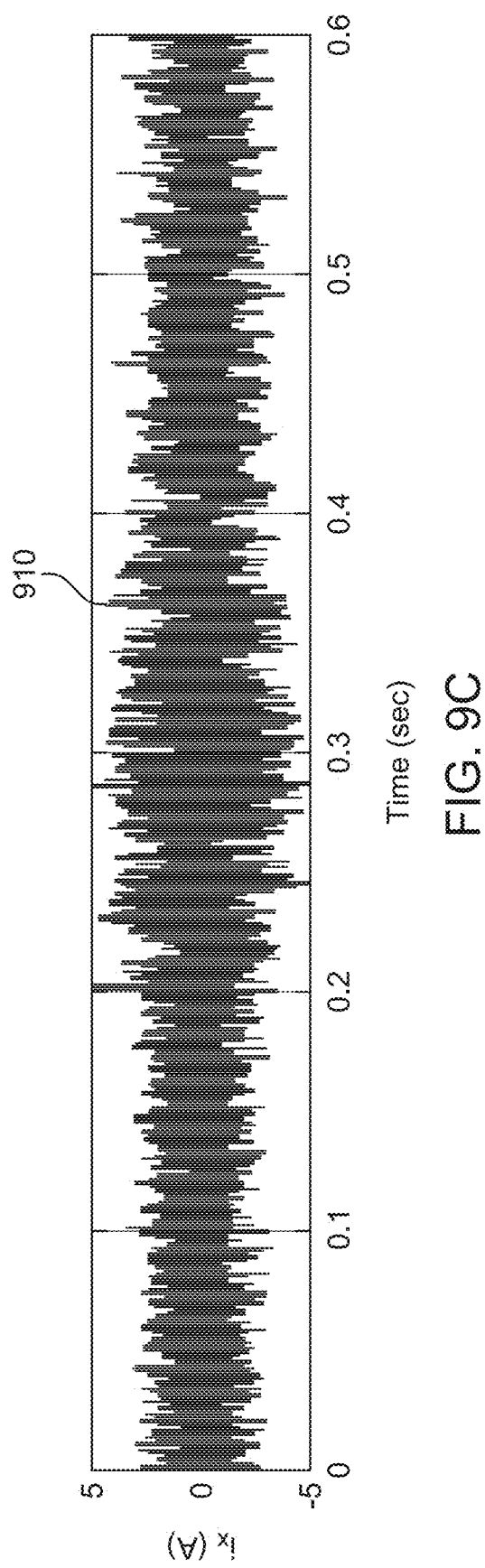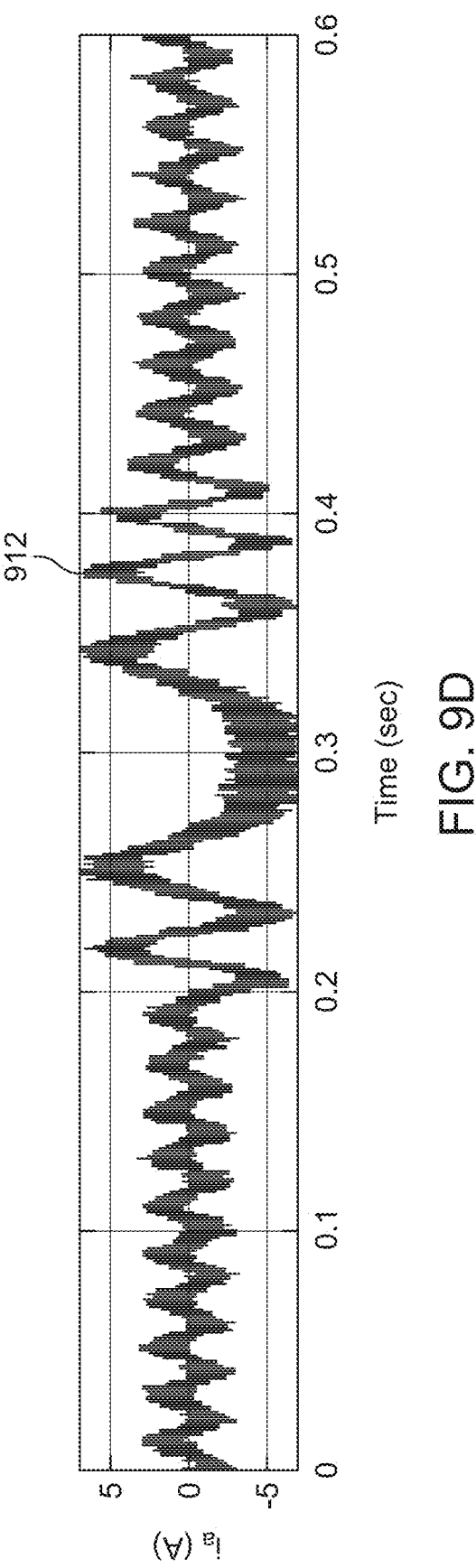

PREDICTIVE CURRENT CONTROL METHOD FOR A SIX-PHASE INDUCTION MOTOR

STATEMENT OF PRIOR DISCLOSURE BY AN INVENTOR

Aspects of the present application were described in "Simple Predictive Current Control of Asymmetrical Six-Phase Induction Motor with Improved Performance," Mohamed Mamdouh, Mohammad Ali Abido, IEEE Transactions on Industrial Electronics, Volume 70, Issue 8, 7580-7590 Nov. 2, 2022, which is incorporated herein by reference in its entirety.

STATEMENT OF ACKNOWLEDGMENT

Support provided by the Interdisciplinary Research Center in Renewable Energy and Power Systems (IRC-REPS), King Fahd University of Petroleum & Minerals, through the funded research project #INRE2103 and KACARE Energy Research and Innovation Center (ERIC), KFUPM, Saudi Arabia is gratefully acknowledged.

BACKGROUND OF THE INVENTION

Technical Field

The present disclosure is related to a method and system for controlling electric drives and power systems. In particular, the present disclosure is related to a predictive current control method for a six-phase induction motor driven by a six-phase inverter.

Description of Related Art

The "background" description provided herein is for the purpose of generally presenting the context of the present disclosure. Work of the presently named inventors, to the extent it is described in this background section, as well as aspects of the description which may not otherwise qualify as prior art at the time of filing, are neither expressly or impliedly admitted as prior art against the present invention.

In recent times, multi-phase machines have gained large interest compared to conventional three-phase counterparts, despite their control mechanism being more complex than those of three-phase machines. Multi-phase machines are characterized by lower torque ripple, reduced current per phase and higher reliability than their three-phase counterparts. Conventional control methods such as direct torque control and field-oriented control have been successfully applied to higher-order phase machines, such as three-phase, six-phase and more. However, they suffer in regulating stator circulating currents, also known as x-y current component.

Control methods, such as, model predictive control (MPC) algorithms have emerged in the power electronic community and proved their capability for different applications. Finite control set-model predictive control (FCS-MPC) is one such convenient choice for multi-phase drives that can meet the torque and flux tracking requirements and simultaneously limit the stator circulating currents by considering a cost function. However, the FCS-MPC has other issues related to implementations such as the variable switching frequency, difficult setting of the weighting factors (WF), and high computation burden. Although, the issue of variable switching frequency is solved by adding modulation stages which also lowers total harmonic distortion (THD) and x-y currents, additional modulation stage increases the complexity of the control procedure. Further, the WF setting is also an issue for FCS-MPC. Several online and offline procedures are implemented for tuning the WF as a part of optimization step of FCS-MPC algorithms. For example, a cost function optimization is implemented, which is based on certain performance indices, followed by a discrete operating space establishment by calculating the performance indices at different operating points and different weighting factors. However, this method is time-consuming and noticeable offline work is required. A predictive current control (PCC) based double dq (2dq) method is generally used in order to eliminate the weighting factors, where a cost function consists of the four stator currents, having same priorities and equal WFs in 2dq space. Another method, such as a virtual voltage vector (VVV) concept maps the voltage vectors to $\alpha\beta$ and x-y subspaces with different magnitudes and orientations. Although, VVV simplifies the cost function design by eliminating the terms relating to x-y currents assuming them equal zero on average, the VVV method suffers from reduced DC link utilization and higher average switching frequency since more than one VV is applied in the same control sample.

FCS-MPC algorithms suffer from a high computation burden compared to other control methods. Moreover, the computation cost increases tremendously with the increased complexity of the system. For example, a six-phase machine feed from two-level voltage source inverter (2L-VSI) creates 64 voltage vectors (VVs) where a minimum of 49 iterations are required for the prediction and optimization processes.

In order to reduce the computation burden, a VSD theory introduced indicates that the largest voltage vectors in a-$\beta$ subspace are mapped to the smallest ones in x-y subspace. It has also been suggested that use of the largest 12 VVs and one zero VV is efficient instead of evaluating the 49 VVs for A6P IM. A constrained search PCC of A6PIM is implemented by applying certain constraints to reduce the number of switching commutations. This results in reducing the number of admissible VV to 6 VVs at each control sample. However, these constraints lead to suboptimal solutions. For example, the PCC algorithm has better tracking and reduced switching frequency compared to the conventional PCC. However, the selection of the admissible VV is complicated and can result in either 11 or 16 VVs to be evaluated depending on the operating point. A concept of deadbeat (PCC-DC) has also been introduced in the past that indicates that it could decrease the number of admissible VVs to three and thus reducing computation burden by calculating the optimal reference voltage and select the closest admissible VV. However, this method needs the calculation of the position of the reference voltage and another optimization step to guarantee regulation of x-y currents. A two-step PCC algorithm for six-phase permanent magnet synchronous machine (PMSM) reduces the computation burden and the switching frequency. In a first step, the phase which has maximum error is identified and its switching state is reversed. In a second step, candidate VVs are formed by retaining the switching state of the first step and reversing the other five phases. This results in 6 VVs to be evaluated in each control sample. However, this method focuses only on the tracking of $\alpha\beta$ subspace and quite a number of components in the x-y subspace were observed.

As described, the existing methods suffer from one or more limitations hindering their adoption for control of multi-phase machines. For example, too many voltage vectors were to be examined. The high number of voltage vectors to be examined causes higher computational burden on the system. Although, some of the methods somehow reduced the computational burden by reducing the number of voltage vectors to be examined, they required computation of location of reference voltage that further aided the burden on computation cost in other ways. Moreover, the average number of switching frequency were also found to be high in almost all of the methods.

Accordingly, there is a need for a control method for multi-phase machines that require only few voltage vectors to be examined, reduce the average number of switching frequencies, minimize the x-y currents and does not accumulate the additional burden of computing a location of the reference voltage vectors. The presently disclosed predictive current control method and system meet such a need by reducing the switching frequency and current total harmonic distortion and regulating the xy currents of an asynchronous six-phase induction motor.

SUMMARY

In an exemplary embodiment, the present disclosure includes a predictive current control method for a six-phase induction motor driven by a six-phase inverter. The method includes initializing the six-phase inverter at a present control sample comprising a present switching state corresponding to a present voltage vector, wherein the six-phase inverter employs the present control sample for converting a DC input voltage to a set of six-phase outputs for an operation of the six-phase induction motor. The method further includes measuring a stator current and a rotor speed of the six-phase induction motor. The method further includes transforming the measured stator current to a set of orthogonal subspace current values. The set of orthogonal subspace current values comprises a set of current values in $\alpha\beta$ and xy frames. The method further includes estimating a set of rotor variables of the six-phase induction motor using a difference between the measured rotor speed and a reference rotor speed. The set of rotor variables comprises a pair of current values in $\alpha\beta$ frame and xy frame. The method further includes calculating a future stator current for a future control sample of the six-phase inverter based on the transformed set of orthogonal subspace current values, estimated set of rotor variables, and the measured rotor speed. The method further includes selecting four candidate voltage vectors from sixty-four voltage vectors mapped to $\alpha\beta$ and xy frames corresponding to sixty-four possible switching states of the six-phase inverter. The method of selecting four candidate voltage vectors includes three additional steps. The first step includes (1) predefining a lookup table representing a correlation between twelve possible non-zero voltage vectors and twelve corresponding groups of voltage vectors. The twelve possible non-zero voltage vectors are twelve possible switching states of the six-phase inverter with on state for at least one of but not all of the set of six phase outputs. Each group of the twelve corresponding groups of voltage vectors comprises four voltage vectors. The second step includes (2) selecting a non-zero voltage vector from at least one of the present voltage vector if the present voltage vector is non-zero and a last appeared nonzero voltage vector from the lookup table, and the third step includes (3) identifying a group of voltage vectors from the lookup table corresponding to the selected non-zero voltage vector. The identified group of voltage vectors corresponds to the four candidate voltage vectors. The method further includes implementing a cost function to calculate a squared error between the predicted future stator current and a reference stator current. A weighing factor is applied to the cost function. The method further includes calculating a plurality of cost function results corresponding to each of the four candidate voltage vectors. The method further includes identifying a future voltage vector providing a minimum of the calculated plurality of cost function results for the future control sample. The method further includes saving the future voltage vector as an optimal voltage vector to be used as an input to the lookup table for the next control sample. The method further includes controlling a plurality of current values in $\alpha\beta$ and xy frames of the six-phase induction motor by applying the future control sample as a switching state of the six-phase inverter.

In another exemplary embodiment, the future control sample comprises at least two future control samples corresponding to the present control sample.

In another exemplary embodiment, the method further includes identifying a control sample with up to one commutation of a set of switches of the six-phase inverter.

In another exemplary embodiment, the method further includes mapping of a plurality of largest voltage vectors in $\alpha\beta$ orthogonal subspace to a plurality of lowest voltage vectors in xy orthogonal subspace.

In another exemplary embodiment, the applied weighing factor corresponds to controlling a current in xy orthogonal subspace.

In another exemplary embodiment, the weighing factor is a value selected from a range of 0.01 up to 0.2.

In another exemplary embodiment, the twelve possible switching states of the six-phase inverter correspond to twelve largest voltage vectors in $\alpha\beta$ orthogonal subspace.

In another exemplary embodiment, the four candidate voltage vectors comprise three active voltage vectors and one zero voltage vector.

In another exemplary embodiment, the three active voltage vectors correspond to three consecutive switching states of the six-phase inverter.

In another exemplary embodiment, the one zero voltage vector is selected from four zero voltage vectors corresponding to four zero switching states of the six-phase inverter.

In another exemplary embodiment, the six-phase inverter comprises two three-phase two level-voltage source inverters (2L-VSI) connected in parallel.

In another exemplary embodiment, the measuring of the rotor speed of the six-phase induction motor utilizing an encoder coupled to the six-phase induction motor.

In another exemplary embodiment, the estimating of the set of rotor variables utilizing a proportional-integral controller.

In another exemplary embodiment, the predictive current control method is performed utilizing a computer module.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 7A illustrates the starting response as a dynamic response of the electric drive system from a standstill to 1100 rpm at no load for a conventional predictive current control (PCC) method using 13 voltage vectors, according to certain embodiments;

FIG. 7B illustrates a starting response as a dynamic response of the electric drive system for a stator current at no-load for a conventional predictive current control (PCC) method using 13 voltage vectors, according to certain embodiments;

FIG. 9A illustrates a reversing response of the electric drive system for conventional predictive current control (PCC) method using 13 voltage vectors for rotation speed, according to certain embodiments;

FIG. 9B illustrates a reversing response of the electric drive system for conventional predictive current control (PCC) method using 13 voltage vectors for subspace currents $i_\alpha$, according to certain embodiments;

FIG. 9C illustrates a reversing response of the electric drive system for conventional predictive current control (PCC) method using 13 voltage vectors for subspace currents $i_x$, according to certain embodiments;

FIG. 9D illustrates a reversing response of the electric drive system for conventional predictive current control (PCC) method using 13 voltage vectors for phase currents $i_a$, according to certain embodiments;

DETAILED DESCRIPTION

Figure 1:
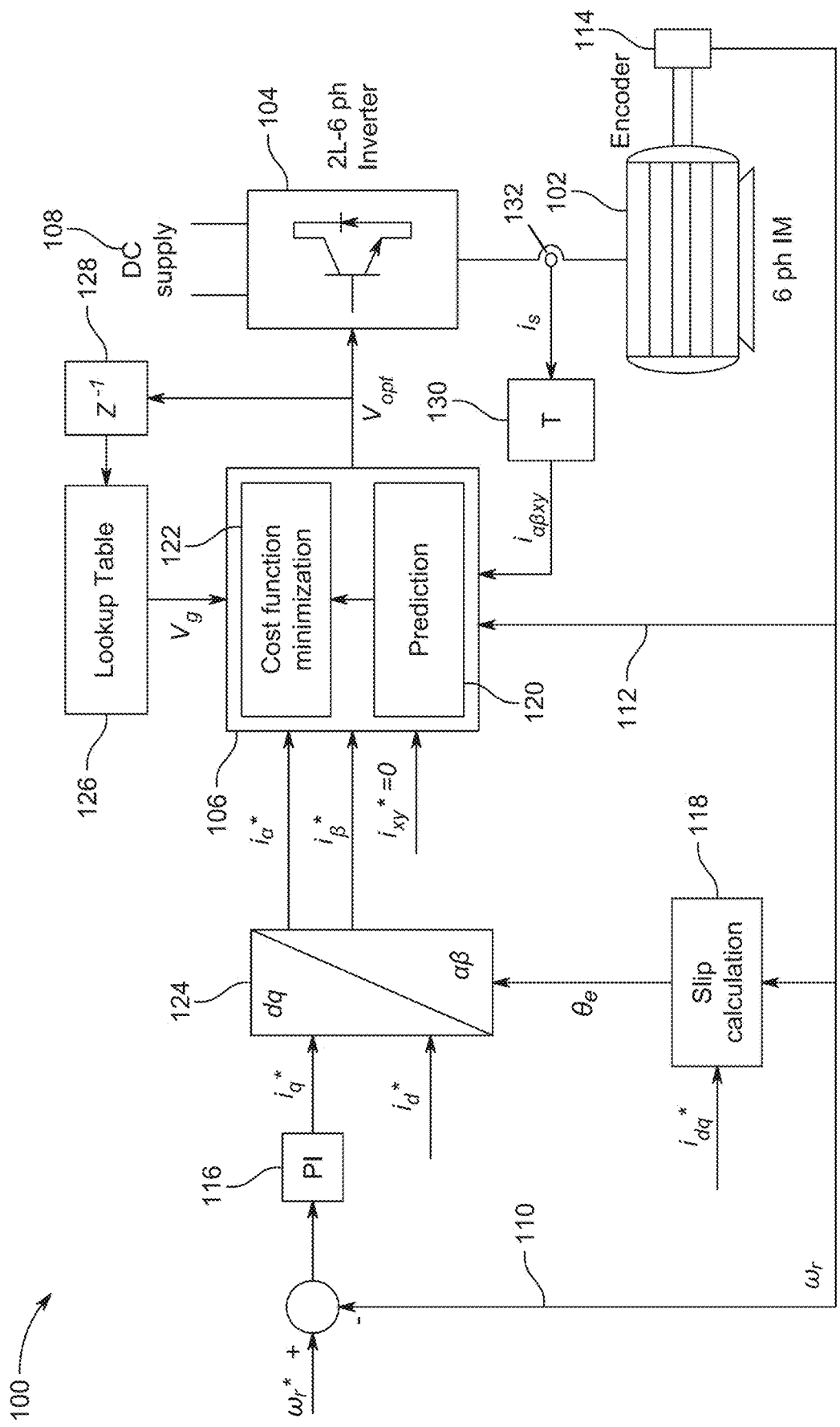
FIG. 1 illustrates a schematic diagram of an electric drive system, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Furthermore, the terms two level-voltage source inverter, 2-level six-phase inverter, 2-L six-phase inverter, 2-level 6P inverter, six-phase inverter or inverter are used as synonyms throughout the disclosure and used interchangeably.

Furthermore, the terms six-phase induction motor, asynchronous six-phase induction motor, 6PIM, 6-PIM, A6PIM, or induction motor are also used as synonyms throughout the disclosure and used interchangeably.

Aspects of this disclosure are directed to a predictive current control method and system for a six-phase induction motor driven by a six-phase inverter that considerably reduces circulating current, computation cost, and switching frequency. In the PCC method a group of only four candidate voltage vectors (VVs) is formed in each control sample for further examination, based on a lookup table and an optimal voltage vector of the previous control sample. The lookup table is designed such that it allows only one commutation in each control sample.

Turning to drawings, FIG. 1 illustrates a schematic diagram of an electric drive system 100 according to certain embodiments of the present disclosure. The electric drive system 100 comprises an asymmetric six phase-induction motor 102, herein also referred to as 6PIM in the disclosure, a 2-level six phase inverter 104, and a controller 106. The 2-level six phase inverter 104 is configured to convert a DC supply 108 to a six phase outputs through a two level-voltage source inverter (2L-VSI) 104. The two level-voltage source inverter 104 is further configured to supply the six phase outputs to the 6PIM 102. The electric drive system 100 further comprises an outer loop 110 and an inner loop 112. An encoder 114 is attached to the rotor axis of the 6PIM 102 for measuring a rotor angular speed $\omega_r$. A current sensor 132 is coupled to the 6PIM 102. The current sensor 132 is configured to measure a stator current $i_s$ of the 6PIM 102 and send the measured stator current $i_s$ to the controller 106 via a first transformation block 130. The controller 106 also receives a rotor angular speed $\omega_r$ via the inner loop 112. In an embodiment, the electric drive system 100 may include a slip calculation block 118 coupled at the output of the encoder 114.

The 2-level six phase inverter 104 includes a parallel connection of two three-phase two level-voltage source inverters (2L-VSI). The 2L-VSI 104 thus has sixty-four possible switching states by combinations of on/off output states of the six phases. Considering the two on/off switching states of each phase of the six-phase inverter, there are sixty-four ($2^6$=64) possible combinations of the six phase outputs of the inverter. The six phase outputs are represented by voltage vectors (hereafter "VVs") as $V_n$(Sa1, Sb1, Sc1, Sa2, Sb2, Sc2) (n=0 to 63), where Sa1, Sb1, Sc1, Sa2, Sb2 and Sc2 each represents an on (1) or an off (0) state of the six phase outputs. The VVs are also denoted by a vector [S] as Sa1Sb1Sc1Sa2Sb2Sc2=[Sa1 Sb1 Sc1 Sa2 Sb2 Sc2]$^T$. In the embodiments herein, the VVs representing the switching states or the six phase outputs of the 2L-VSI 104 are the manipulated variables in the predictive current control (PCC) method for controlling the 6PIM 102. The output phase voltages of the 2-level six phase inverter 104 can be mathematically expressed as follows:

$$VVs = \begin{bmatrix} v_{a1} \\ v_{b1} \\ v_{c1} \\ v_{a2} \\ v_{b2} \\ v_{c2} \end{bmatrix} = \frac{V_{dc}}{3} \begin{bmatrix} 2 & -1 & -1 & 0 & 0 & 0 \\ -1 & 2 & -1 & 0 & 0 & 0 \\ -1 & -1 & 2 & 0 & 0 & 0 \\ 0 & 0 & 0 & 2 & -1 & -1 \\ 0 & 0 & 0 & -1 & 2 & -1 \\ 0 & 0 & 0 & -1 & -1 & 2 \end{bmatrix}[S] \quad (1)$$

The controller 106 includes a programming code that defines a transformation matrix $T_{VSD}$ as below:

$$T_{VSD} = \frac{1}{\sqrt{3}} \begin{bmatrix} 1 & -\frac{1}{2} & -\frac{1}{2} & \frac{\sqrt{3}}{2} & -\frac{\sqrt{3}}{2} & 0 \\ 0 & \frac{\sqrt{3}}{2} & -\frac{\sqrt{3}}{2} & \frac{1}{2} & \frac{1}{2} & -1 \\ 1 & -\frac{1}{2} & -\frac{1}{2} & -\frac{\sqrt{3}}{2} & \frac{\sqrt{3}}{2} & 0 \\ 0 & -\frac{\sqrt{3}}{2} & \frac{\sqrt{3}}{2} & \frac{1}{2} & \frac{1}{2} & -1 \end{bmatrix} \quad (2)$$

Figure 2A:
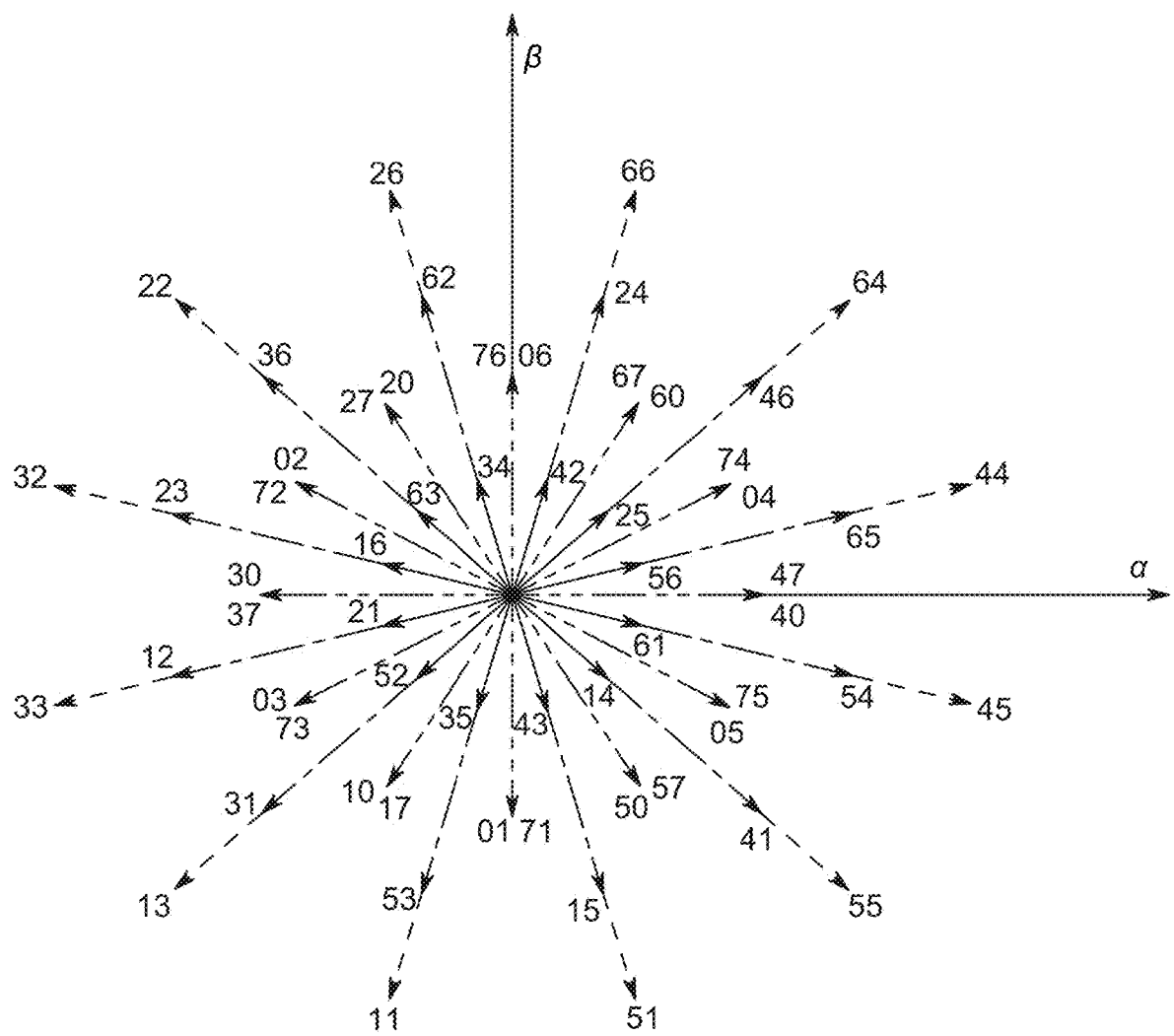
FIG. 2A illustrates a mapping of resultant voltage vectors (VVs) to αβ subspaces for 49 voltage vectors (VVs), according to certain embodiments.
Figure 2B:
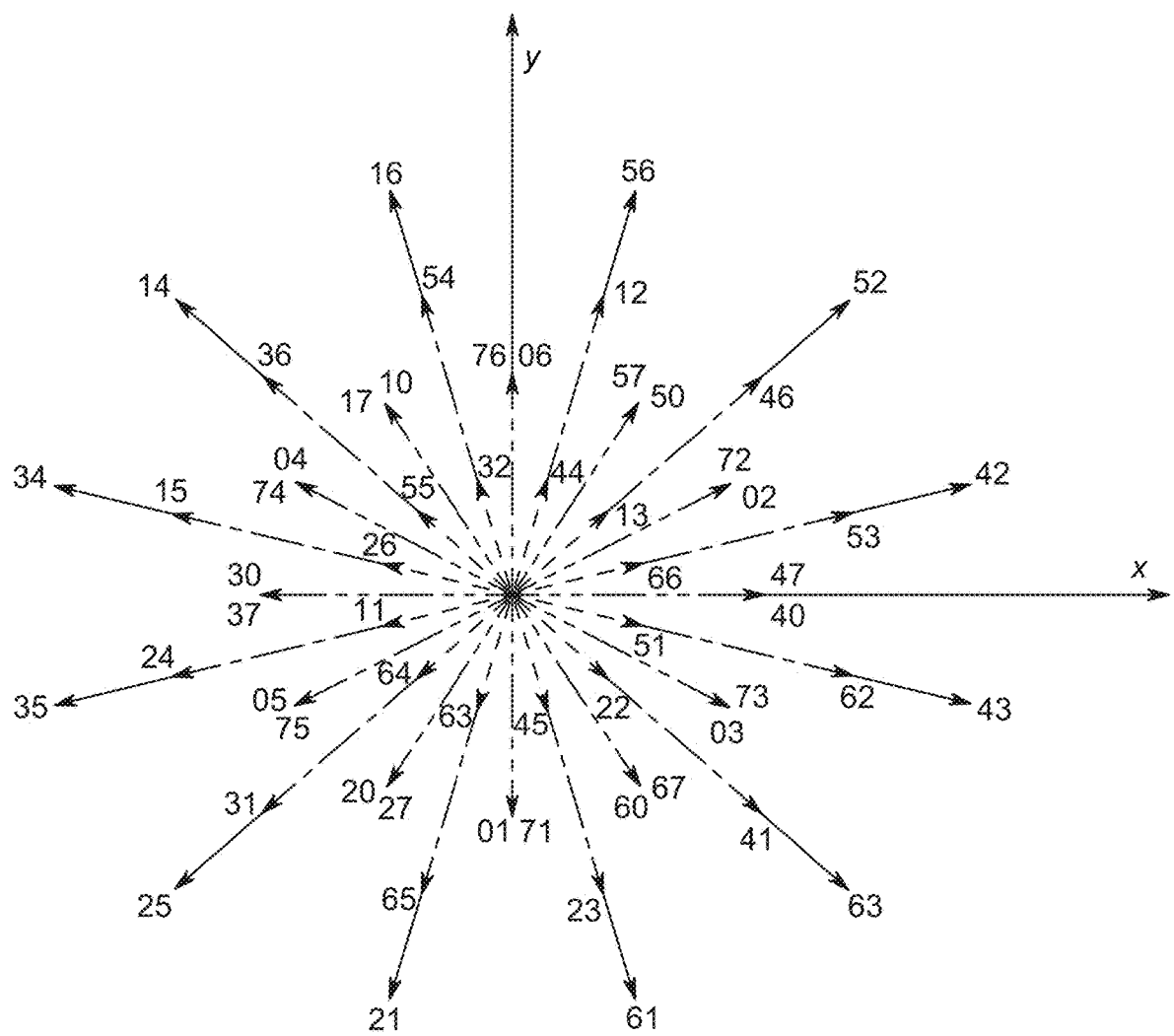
FIG. 2B illustrates a mapping of resultant voltage vectors (VVs) to xy subspaces for 49 voltage vectors (VVs), according to certain embodiments.

The transformation matrix is used for mapping the resultant voltage vectors from the switching states to αβ and xy subspaces. FIG. 2A illustrates mapping of the resultant VVs to αβ subspaces, and FIG. 2B illustrates the mapping of the resultant VVs to xy subspaces. The numbers associated to each VV represent two octal numbers corresponding to the binary numbers [Sa1 Sb1 Sc1] and [Sa2 Sb2 Sc2], respectively. Considering FIG. 2A and FIG. 2B, it is to be noted that the 12 largest VVs in the αβ subspace are corresponding to the smallest VVs in the xy subspace. Therefore, the controller 106 is configured to map 12 largest voltage vectors in αβ orthogonal subspace to a plurality of lowest voltage vectors in the xy orthogonal subspace. Furthermore, the twelve possible switching states of the six-phase inverter 104 correspond to twelve largest voltage vectors in αβ orthogonal subspace. The controller 106 is configured to identify resultant voltage vectors (VVs) derived from the stator current $i_s$, that are illustrated in FIGS. 2A and 2B.

Referring back to FIG. 1, the outer loop 110 is configured to process the rotor angular speed $\omega_r$ of the 6PIM 102 as detected by the encoder 114 coupled to the six-phase induction motor 102. A proportional integral (PI) controller 116 utilizes the rotor angular speed $\omega_r$ of the 6PIM 102 in comparison to a reference rotor speed $\omega_r$, in estimating a set of rotor variables iq* and id*. Once the set of rotor variables iq* and id* are obtained, they are again converted into an αβ frame and xy frame using a second transformation block 124 and reference rotor current values in a, B and xy subspace, i.e. $i_\alpha$*, $i_\beta$* and $i_{xy}$* are generated. The second transformation block 124 is coupled at the output of the proportional integral (PI) controller 116. In an embodiment, the second transformation block 124 may again include a programming code that defines the transformation matrix $T_{VSD}$ as provided in the equation (2) along with other equations to identify the set of rotor variables iq* and id* in the αβ frame and xy frame to generate $i_\alpha$*, $i_\beta$* and $i_{xy}$*. The transformation matrix $T_{VSD}$ thus uses a plurality of equations to convert the set of rotor variables iq* and id* into three orthogonal subspaces αβ frame, xy frame, and $z_1z_2$ frame. Components of subspace $z_1z_2$ are neglected for isolated neutrals of the six-phase induction motor 102.

The controller 106 of the electric drive system 100 further comprises a prediction block 120 and a cost function minimization block 122. The prediction block 120 is configured to select in each of the sampling steps a plurality of candidate voltage vectors (CVVs) as candidates for a primary voltage vector $V_{opt}$ to be applied as a switching state of the 2L-VSI 104 in a following sampling step. The prediction block 120 is further configured to predict future values of the control variables corresponding to each of the plurality of CVVs when applied as the switching state of the 2L-VSI 104 in the following sampling step. The cost function minimization block 122 is configured to choose a primary VV giving a minimum value of a predefined cost function from among the plurality of CVVs selected at the prediction block 120. The predefined cost function adopted in a certain embodiment of the present disclosure represents a squared error between the predicted and reference stator currents of the induction motor, as detailed below in description of the mathematical model of the induction motor.

In a certain embodiment of the present disclosure, the controller 106 is configured to store a predefined lookup table 126 before starting a first sampling step, where the predefined lookup table 126 defines a correlation between a primary voltage vector (VV) that was adopted at a previous sampling step (an optimal voltage vector) or given by an initial condition (denoted as $V_{old}$) and a voltage vector group ($VV_g$) comprising four candidate voltage vectors (CVVs). The four candidate voltage vectors ($VV_g$) comprise three active voltage vectors and one zero voltage vector. Also, the three active voltage vectors correspond to three consecutive switching states of the 2-level six-phase inverter 104. For example, if the Vold is $V_5$, the three consecutive switching states corresponding to candidate voltage vectors ($VV_g$) is [$V_{16}$ $V_5$ $V_6$] followed by a zero-voltage vector $V_1$. Thus, the last optimal voltage vectors $V_{old}$ and its corresponding candidate voltage vectors ($VV_g$) are thus predefined in the lookup table 126 and is given by Table 1, detail of which is described later. Further, the prediction block 120 of the controller 106 is configured to select a $VV_g$ comprising the four CVVs by referring the lookup table 126 and identifying the $VV_g$ corresponding to a given $V_{old}$, in each of the sampling steps.

TABLE 1

Lookup table to form the candidate VVs based on the old optimal voltage vector

| $V_{old}$ Or($V_{NZ}$ Last optimal) | Candidate VVs ($V_g$) |
|---|---|
| $V_5$ | [$V_{16}$ $V_5$ $V_6$ $V_1$] |
| $V_6$ | [$V_5$ $V_6$ $V_7$ $V_2$] |
| $V_7$ | [$V_6$ $V_7$ $V_8$ $V_4$] |
| $V_8$ | [$V_7$ $V_8$ $V_9$ $V_3$] |
| $V_9$ | [$V_8$ $V_9$ $V_{10}$ $V_1$] |
| $V_{10}$ | [$V_9$ $V_{10}$ $V_{11}$ $V_2$] |
| $V_{11}$ | [$V_{10}$ $V_{11}$ $V_{12}$ $V_4$] |
| $V_{12}$ | [$V_{11}$ $V_{12}$ $V_{13}$ $V_3$] |
| $V_{13}$ | [$V_{12}$ $V_{13}$ $V_{14}$ $V_1$] |
| $V_{14}$ | [$V_{13}$ $V_{14}$ $V_{15}$ $V_2$] |
| $V_{15}$ | [$V_{14}$ $V_{15}$ $V_{16}$ $V_4$] |
| $V_{16}$ | [$V_{15}$ $V_{16}$ $V_5$ $V_3$] |

Figure 3A:
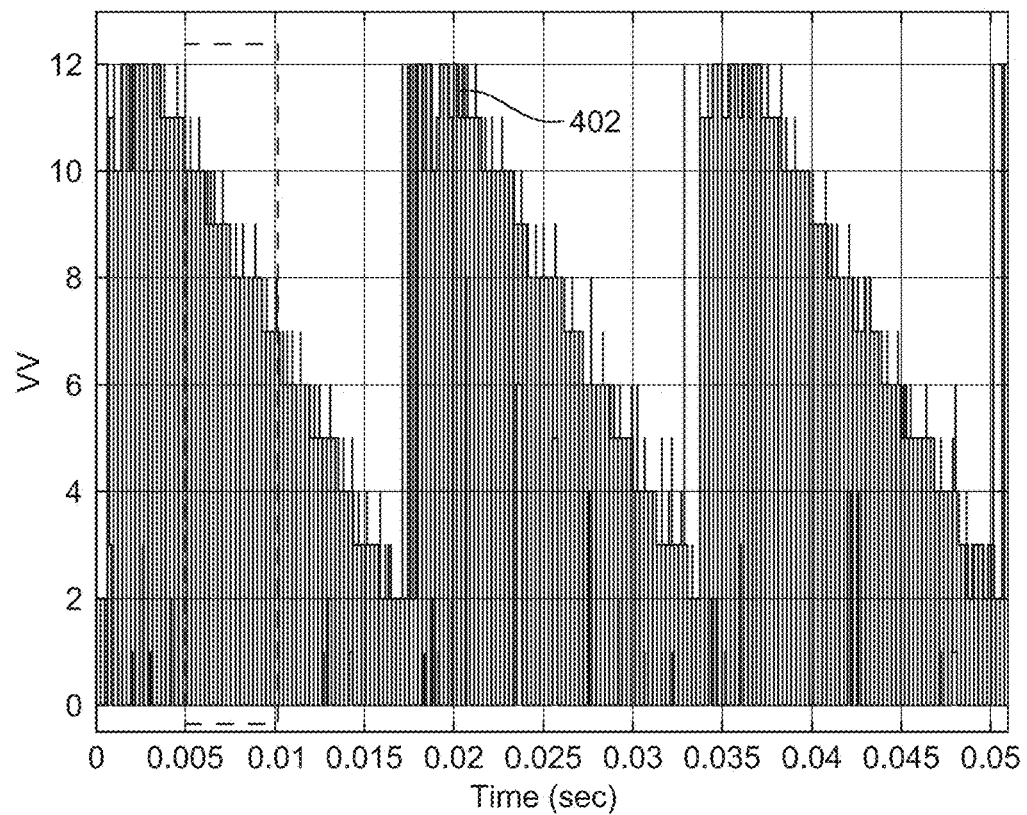
FIG. 3A illustrates selected optimal voltage vectors (VVs) for conventional predictive current control (PCC) at 1100 rpm and 3 Nm for three electric cycles, according to certain embodiments.

FIG. 3A illustrates selected optimal VVs for the conventional PCC at 1100 rpm and 3 Nm for three electric cycles, according to an embodiment. A first plot 402 depicts a magnitude of voltage vectors with respect to time. FIG. 3A shows the selected 12 optimal VV at each sample for the conventional PCC that tends to be selected in successive manner.

Figure 3B:
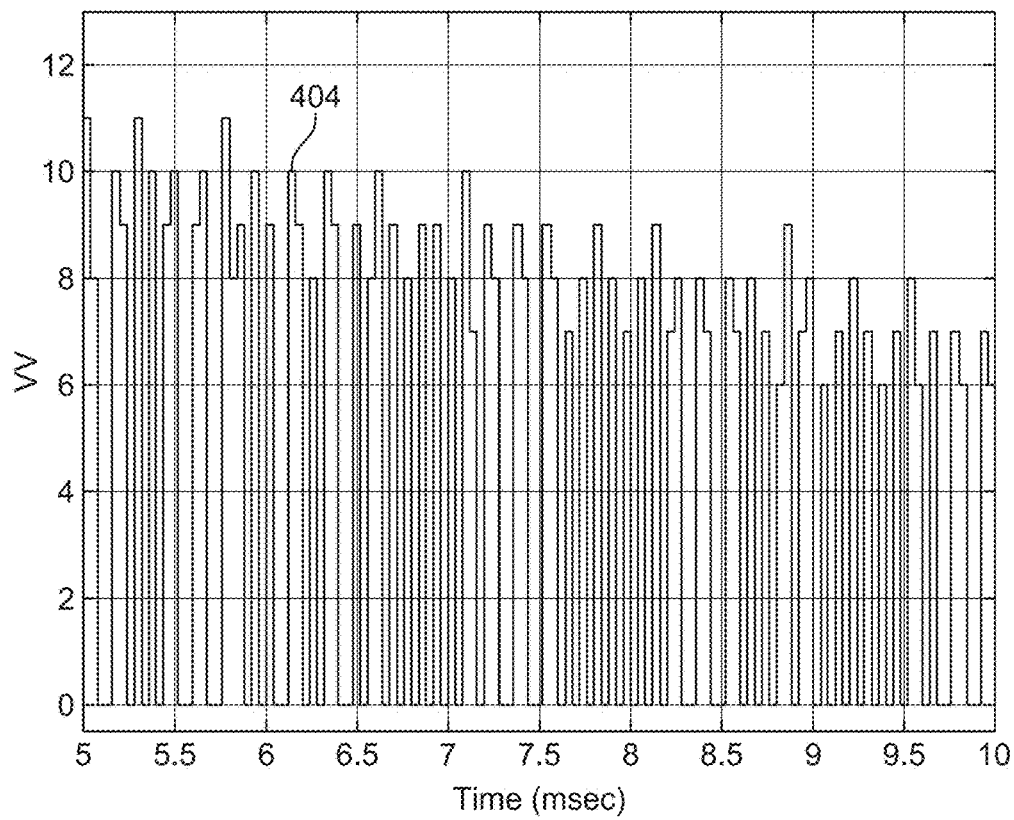
FIG. 3B illustrates a zoomed view of the selected optimal voltage vectors (VVs) for conventional PCC at 1100 rpm and 3 Nm for three electric cycles, according to certain embodiments.

FIG. 3B illustrates a zoomed view of the selected optimal VVs for the conventional PCC at 1100 rpm and 3 Nm for three electric cycles, according to an embodiment. A second plot 404 illustrates a magnified view of the selected optimal VVs with respect to time. The enlarged view indicates that the optimal VV is related to the previously selected one. Thus, the candidate vector group $VV_g$ for the next sample could be formed based on the old optimal voltage vector $V_{old}$. For example, if the current optimal voltage vector is $V_n$, the next optimal vectors could be related to its previous optimal voltage vector $V_{n-1}$, next optimal voltage vector $V_{n+1}$ and one zero vector only. In an embodiment, forming the group of four CCVs (VVg) by the controller 106 is based upon the switching state vectors of the voltage vectors. It is to be noted that, that the optimal VVs are selected in successive manner as illustrated in FIGS. 3A and 3B.

Considering FIG. 3A and FIG. 3B, the controller 106 is programmed and configured to form the lookup table 126 for each voltage vector based upon old VV ($V_{old}$), the preceding VV ($V_{old-1}$), the following VVs ($V_{old+1}$) in the αβ subspace and one zero VV. The voltage vector $V_5$-$V_{16}$ are non-zero voltage vector whereas $V_1$-$V_4$ are zero voltage vectors. In an embodiment, one zero voltage vector i.e. $V_1$, $V_2$, $V_3$, and $V_4$ is selected from four zero voltage vectors corresponding to four zero switching states of the 2-level six-phase inverter 104. This is illustrated in Table 2 as below and shown in FIGS. 3C and 3D thereof:

TABLE 2

List of admissible VVs

| $VV_n$ | Two octal digits | Switching states $[S_{a1}\ S_{b1}\ S_{c1}\ S_{a2}\ S_{b2}\ S_{c2}]$ | \|VV\| (αβ) |
|---|---|---|---|
| $V_1$ | 0 0 | [0 0 0 0 0 0] | Zero |
| $V_2$ | 0 7 | [0 0 0 1 1 1] | |
| $V_3$ | 7 0 | [1 1 1 0 0 0] | |
| $V_4$ | 7 7 | [1 1 1 1 1 1] | |
| $V_5$ | 4 4 | [1 0 0 1 0 0] | Large |
| $V_6$ | 6 4 | [1 1 0 1 0 0] | |
| $V_7$ | 6 6 | [1 1 0 1 1 0] | |
| $V_8$ | 2 6 | [0 1 0 1 1 0] | |
| $V_9$ | 2 2 | [0 1 0 0 1 0] | |
| $V_{10}$ | 3 2 | [0 1 1 0 1 0] | |
| $V_{11}$ | 3 3 | [0 1 1 0 1 1] | |
| $V_{12}$ | 1 3 | [0 0 1 0 1 1] | |
| $V_{13}$ | 1 1 | [0 0 1 0 0 1] | |
| $V_{14}$ | 5 1 | [1 0 1 0 0 1] | |
| $V_{15}$ | 5 5 | [1 0 1 1 0 1] | |
| $V_{16}$ | 4 5 | [1 0 0 1 0 1] | |

Figure 3C:
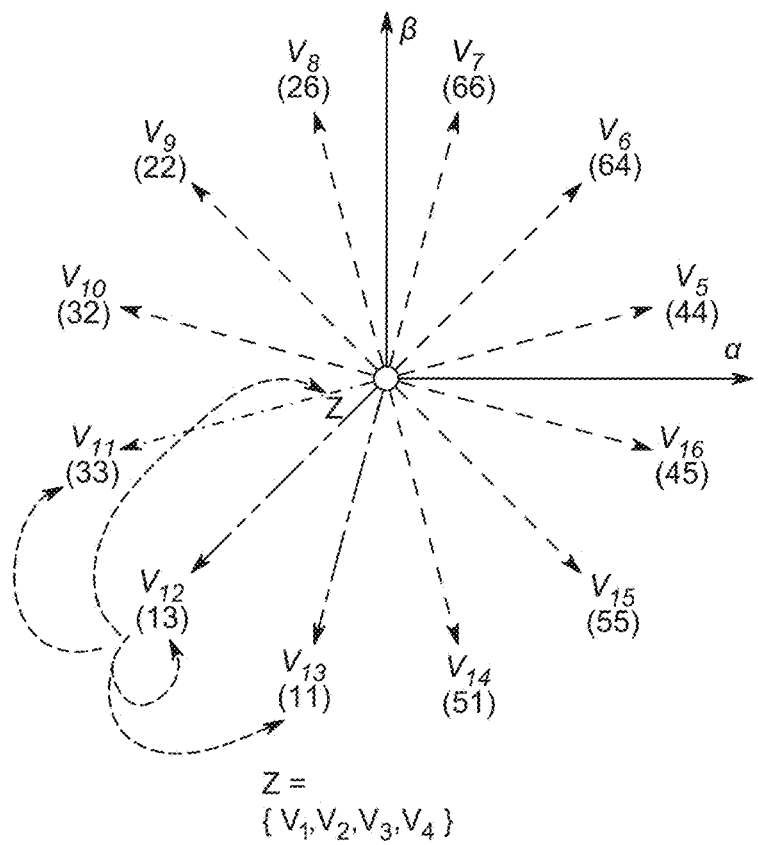
FIG. 3C illustrates a mapping of voltage vectors (VVs) in αβ subspaces for all 16 voltage vectors (VVs) (12 Non-zero and four zero vectors), according to certain embodiments.

FIG. 3C illustrate mapping of voltage vectors VVs in αβ subspaces for all 16 VVs (12 Non-zero and four zero vectors) as listed in Table 2, according to an embodiment. If the Vold is $V_{12}$, the candidate group Vg is [$V_g$=$V_{11}$, $V_{12}$, $V_{13}$, $V_3$], where $V_3$ is a zero vector.

Figure 3D:
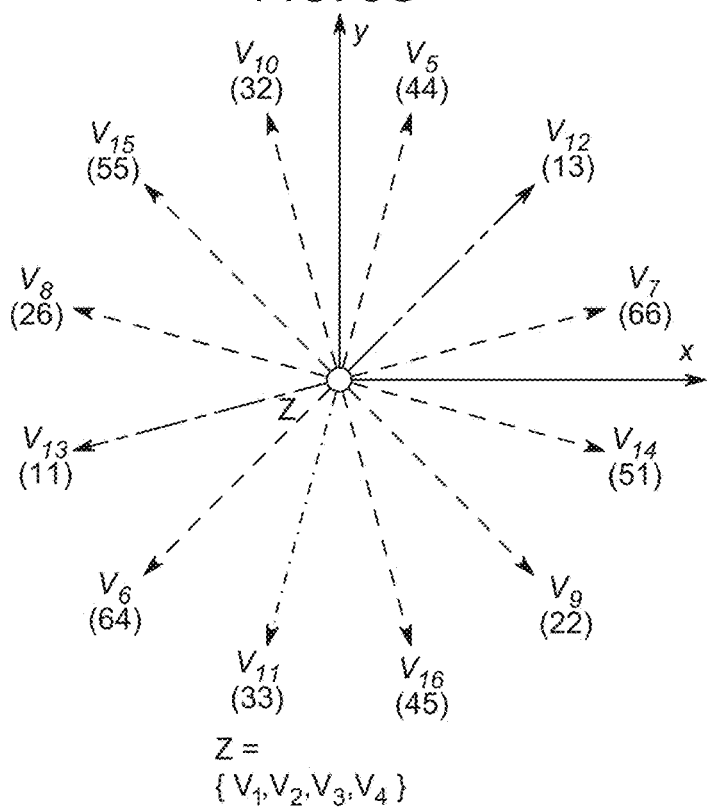
FIG. 3D illustrates a mapping of voltage vectors (VVs) in the xy subspaces for all 16 VVs (12 Non-zero and four zero vectors), according to certain embodiments.

FIG. 3D illustrate mapping of voltage vectors VVs in the xy subspaces for all 16 VVs (12 Non-zero and four zero vector as listed in Table 1, according to an embodiment. Since 12 largest VVs in the αβ subspace may provide a comparable performance as they are mapped to the smallest VVs in xy subspace, plurality of largest voltage vectors in αβ orthogonal subspace are thus mapped into a plurality of lowest voltage vectors in xy orthogonal subspace in the controller 106.

Table 2 defines the $VV_g$ correlated with the $V_{old}$ exclusively when the $V_{old}$ is a nonzero voltage vector. The nonzero voltage vector represents one of 12 possible switching states of the 2L-VSI, namely, $V_5$ to $V_{16}$ of the Table 1, with an on (value 1) state for at least one of but not all of the six phase outputs. As indicated herein, the lookup table as shown in Table 1 covers the correlation between the nonzero voltage vector and the $VV_g$ for all 12 possible cases of the optimal voltage vector. For other situations where the $V_{old}$ was not the nonzero vector, an optimal voltage vector is selected based on last appeared optimal voltage vector $V_{NZ}$ in an earlier sampling step if available, or otherwise given by an initial condition. For example, when the given present voltage vector is $V_{old}$, for example, $V_6$ (110100), the four allowable VVs are, for example, $V_5$ (1 0 0 1 0 0), $V_6$ (110100), $V_7$ (110110), and $V_2$ (000111), as confirmed in Table 2. On the other side, if the present voltage vector is a zero-voltage vector, last appeared non-zero voltage vector is selected as optimal voltage vector for the future sampling.

Initially the 2-level six phase inverter 104 is initialized at a present control sample. The present control sample may refer to the values of stator current $i_s$. The initial switching state of the inverter 104 corresponds to a present voltage vector VV. For example, the present voltage vector VV may be $V_5$ at which the inverter 104 is initialized. The inverter 104 uses the present control sample in order to convert a DC input voltage from the DC supply 108 into a set of six-phase outputs for an operation of the 6PIM 102. Accordingly, initially at any arbitrary voltage vector from the inverter, the 6PIM 102 is initialized.

Mathematically, the model equations for 6PIM 102 required for the estimation, the prediction and the identification made in each of the sampling steps are described below. When a stationary reference frame, commonly called αβ frame is adopted and a stator current $i_s$ is considered as a state variable, the model dynamic equations of the 6PIM 102 can be expressed as follows:

$$\left. \begin{array}{l} v_{\alpha\beta s} = R_s i_{\alpha\beta s} + p\lambda_{\alpha\beta s} \\ v_{xy} = R_s i_{xy} + p\lambda_{xy} \\ 0 = R_r i_r + p\lambda_r - j\omega_r \lambda_r \end{array} \right\} \quad (3)$$

$$\left. \begin{array}{l} \lambda_{\alpha\beta s} = (L_{ls} + L_{lm} + L_m) i_{\alpha\beta s} + L_m i_r) \\ \lambda_{xy} = L_{ls} i_{xy} \\ \lambda_r = L_m i_{\alpha\beta s} + (L_{lr} + L_m) i_r \end{array} \right\} \quad (4)$$

$$T_e = \frac{3}{2} \frac{P}{2} \frac{L_m}{L_r} (\lambda_r \times i_{\alpha\beta s}) \quad (5)$$

where $v_{\alpha\beta s}$=[$v_{\alpha s}\ v_{\beta s}$]$^T$, $v_{xy}$=[$v_x\ v_y$]$^T$, $i_{\alpha\beta s}$=[$i_{\alpha s}\ i_{\beta s}$]$^T$, $i_r$=[$i_{\alpha r}\ i_{\beta r}$]$^T$, $i_{xy}$=[$i_x\ i_y$]$^T$, $\lambda_{\alpha\beta s}$=[$\lambda_{\alpha s}\ \lambda_{\beta s}$]$^T$, $\lambda_r$=[$\lambda_{\alpha r}\ \lambda_{\beta r}$]$^T$, $\lambda_{xy}$=[$\lambda_x\ \lambda_y$]$^T$, $R_s$ and $R_r$ are resistances of stator and rotor, respectively. $L_{ls}$ and $L_{lr}$ are leakage inductances of stator and rotor, respectively. $L_m$ and $L_{lm}$ are the mutual inductance and stator leakage mutual inductance, respectively. $\omega_r$ is electrical rotor speed.

$$j = \begin{bmatrix} 0 & -1 \\ 1 & 0 \end{bmatrix}.$$

The stator input voltage vector in an orthogonal αβ frame, at the output of the six-phase inverter is given as equation 1 earlier:

$$\begin{bmatrix} v_{a1} \\ v_{b1} \\ v_{c1} \\ v_{a2} \\ v_{b2} \\ v_{c2} \end{bmatrix} = \frac{V_{dc}}{3} \begin{bmatrix} 2 & -1 & -1 & 0 & 0 & 0 \\ -1 & 2 & -1 & 0 & 0 & 0 \\ -1 & -1 & 2 & 0 & 0 & 0 \\ 0 & 0 & 0 & 2 & -1 & -1 \\ 0 & 0 & 0 & -1 & 2 & -1 \\ 0 & 0 & 0 & -1 & -1 & 2 \end{bmatrix} [S]$$

where $V_{dc}$=DC link voltage and $[S]=[S_{a1}\ S_{b1}\ S_{c1}\ S_{a2}\ S_{b2}\ S_{c2}]^T$ as a switching state vector as 0 or 1.

As such, any arbitrary or initial voltage vector may be applied at the output of the inverter 104 based upon an initial switching state of the inverter 104.

Now a stator current $i_s$ and a rotor angular speed $\omega_r$ of the 6PIM 102 is measured, corresponding to initial switching state of the inverter 104. For example, the current sensor, such as an ammeter 132 connected at the output of the 2L-6P inverter 104 is configured to measure the stator current $i_s$. Similarly, the encoder 114 measures the rotor speed $\omega_r$ of the 6PIM 104. Once the stator current $i_s$ is measured, it is transformed into the set of orthogonal subspace current values, i.e. in $\alpha\beta$ and xy frames using the first transformation block 130 explained earlier. For example, the first transformation block 130 including the mathematical equation as provided in equation 2 transforms the is into $\alpha\beta$, xy subspace. The output is provided as one of the inputs to the controller 106.

Further, a set of rotor variables i.e., iq* and id* is estimated. In an embodiment, a difference between the measured rotor speed $\omega_r$ and a reference rotor speed $\omega_r^*$ is measured, for example using a difference measuring circuit (not shown). In an embodiment, the difference between the measured rotor speed or and a reference rotor speed $\omega_r^*$ is further provided as an input to the PI controller 116. The PI controller 116 is configured to generate the set of rotor variables i.e. iq* and id*. Once the set of rotor variables i.e., iq* and id* are generated, they are provided as input to the second transformation block 124 such that the set of rotor variables transforms into a pair of current values in $\alpha\beta$ frame and xy frame, i.e. i$\alpha$*, i$\beta$* and ixy*. In an embodiment, the second transformation block 124 may also include mathematical equation as provided in equation 2 to transforms the iq* and id* into $\alpha\beta$, xy subspace.

Now, the model of the 6PIM 102 is arranged in matrix format based on the dynamic model of equations (3) and (4), as follows:

$$\begin{bmatrix} v_{\alpha s} \\ v_{\beta s} \\ 0 \\ 0 \end{bmatrix} = \quad (6)$$

$$\begin{bmatrix} R_s & 0 & 0 & 0 \\ 0 & R_s & 0 & 0 \\ 0 & \omega_r L_m & R_r & \omega_r L_r \\ -\omega_r L_m & 0 & -\omega_r L_r & R_r \end{bmatrix} \begin{bmatrix} i_{\alpha s} \\ i_{\beta s} \\ i_{\alpha r} \\ i_{\beta r} \end{bmatrix} + \begin{bmatrix} L_s & 0 & L_m & 0 \\ 0 & L_s & 0 & L_m \\ L_m & 0 & L_r & 0 \\ 0 & L_m & 0 & L_r \end{bmatrix} \cdot p \cdot \begin{bmatrix} i_{\alpha s} \\ i_{\beta s} \\ i_{\alpha r} \\ i_{\beta r} \end{bmatrix}$$

$$\begin{bmatrix} v_{xs} \\ v_{ys} \end{bmatrix} = \begin{bmatrix} R_s & 0 \\ 0 & R_s \end{bmatrix} \begin{bmatrix} i_{xs} \\ i_{ys} \end{bmatrix} + \begin{bmatrix} L_{ls} & 0 \\ 0 & L_{ls} \end{bmatrix} \cdot p \cdot \begin{bmatrix} i_{xs} \\ i_{ys} \end{bmatrix} \quad (7)$$

where $L_s = L_{ls} + L_{lm} + L_m$ and $L_r = L_{lr} + L_m$ and stator currents is are considered as the state variables.

Further Discrete model is obtained using first Euler discretization method as follows:

$$X(k+1) = A_d(k)X(k) + B_d U(k) + C(k) \quad (8)$$

where $X = [i_{\alpha s}\ i_{\beta s}\ i_x\ i_y]^T$ and $U = [v_{\alpha s}\ v_{\beta s}\ v_x\ v_y]^T$ can be obtained from the DC link voltage and switching states as given in (5) followed by VSD transformation using equation (1).

$$\text{Also, } A_d = I + T_s \begin{bmatrix} -a_1 & a_2\omega_r & 0 & 0 \\ -a_2\omega_r & -a_1 & 0 & 0 \\ 0 & 0 & -a_3 & 0 \\ 0 & 0 & 0 & -a_3 \end{bmatrix} \quad (9)$$

$$B_d = T_s \begin{bmatrix} b_1 & 0 & 0 & 0 \\ 0 & b_1 & 0 & 0 \\ 0 & 0 & b_2 & 0 \\ 0 & 0 & 0 & b_2 \end{bmatrix} \quad (10)$$

where, where k denotes the $k^{th}$ sampling step, I is the identity matrix and $T_s$ is a duration time of the sampling steps. Also, $$c_1 = L_s L_r - L_m^2,\ a_1 = \frac{R_s L_r}{c_1},\ a_2 = \frac{L_m^2}{c_1},\ a_3 = \frac{R_s}{L_{ls}},\ b_1 = \frac{L_r}{c_1} \text{ and } b_2 = \frac{1}{L_{ls}},$$

and $$C(k) = X(k) - (A_d(k)X(k-1) + B_d U(k-1)) \quad (11)$$

is considered as a zero initial condition.

In order to compensate for the time delay caused by calculation process, the variables at the $(k+2)^{th}$ sampling step can be predicted as follows.

$$X(k+2) = A_d(k)X(k+1) + B_d U(k+1) + C(k+1) \quad (12)$$

$$C(k+1) = X(k+1) - (A_d(k)X(k) + B_d U(k)) \quad (13)$$

Based upon the equations 11-13, the prediction block 120 of the controller 106 is configured to predict future stator current X (k+2) for a future control sample of the 6PIM 102. As such, values of one step ahead of stator currents is are predicted using system model provided in equations 6 through 13. In an embodiment, the prediction block 120 receives the transformed set of orthogonal subspace current values, the estimated set of rotor variables, and the measured rotor speed to predict the future stator current as X (K+2). In an embodiment, future control sample comprises at least two future control samples corresponding to the present control sample.

The controller 106 initially predefines the lookup table 126 as explained in Table 1 and Table 2 containing twelve possible group of VVs. Each group of voltage vector VV corresponds to three neighbor voltage vectors and a zero voltage vector as defined in Table 1 and Table 2 as described previously.

The controller 106 is further configured to select a non-zero voltage vector $V_{NZ}$ or $V_{old}$ from the lookup table 126 described in Table 2. Selecting an optimal VV is now explained with two examples below:

Example I: If the last voltage vector was a non-zero VV as appeared during the last optimal voltage vector selection.

The controller 106 checks if the selected non-zero vector appeared as an optimal voltage vector $V_{opt}$ during the last sampling period $V_{old}$ within the lookup table 126 as stored in a memory block 128. For example, if the controller 106 identifies that the present selected voltage vector, for example, is $V_5$, and during the last sampling period i.e. $K^{th}$ sampling period, the voltage vector $V_5$ appeared as an optimal voltage vector $V_{opt}$ to be applied as an input for the inverter 104. If so the controller 106 is configured to select the previous selected optimal voltage vector $V_5$ as $V_{old}$ for computing the cost function to identify the minimum value of the cost function at the currently identified voltage vector $V_5$. Since, the new optimal voltage vectors i.e. $V_5$ for the next sample must corresponds to four neighbor candidate voltage vectors to the optimal voltage vector $V_5$, as per Table 2 defined in the controller 106, the controller 106 is configured to identify the group of voltage vectors from the lookup table 126 corresponding to the selected non-zero voltage vector $V_5$. The candidate voltage vector group $V_g$ corresponding to $V_5$ are four different voltage vectors, for example $[V_{16}\ V_5\ V_6\ V_1]$ as provided in Table 2. It means that the optimal voltage vector must be at least one selected from the candidate voltage vector $[V_{16}\ V_5\ V_6\ V_1]$ for the next sampling periods. Accordingly, the controller 106 identifies the group of voltage vector $V_g$ as $[V_{16}\ V_5\ V_6\ V_1]$ from the lookup table 126 corresponding to the selected non-zero voltage vector $V_5$.

Example II: If the present voltage vector is a zero VV as appeared during the last optimal voltage vector selection.

The controller 106 checks if the last appeared optimal voltage vector $V_{opt}$ was a zero-voltage vector during the last sampling period within the lookup table 126 as stored in a memory block 128. For example, if the controller 120 identifies that the present selected voltage vector, for example, is $V_1$, and during the last sampling period i.e. $K^{th}$ sampling period, the voltage vector $V_1$ appeared as an optimal voltage vector $V_{opt}$ to be applied as an input for the inverter 104. If so the controller 106 is configured to select last active (non-zero) optimal VV referred here as $V_{NZ}$ that was selected as an optimal voltage vector at one step one earlier before the application of the zero-voltage vector for the next step. For example, before the application of zero-voltage vector as an optimal voltage vector for applying as a switching state of the inverter 104, one more immediate active non-zero voltage vector was, for example $V_7$, is identified. In this case, the voltage vector for the next step is thus selected as a non-zero voltage vector $V_7$ since the last voltage vector is a zero-voltage vector. As such, the controller selects $V_7$ for computing the cost function to identify the voltage vector that yields the minimum value of the cost function at the currently identified voltage vector $V_7$.

The controller 106 is configured to identify the group of voltage vectors from the lookup table 126 corresponding to the selected non-zero voltage vector $V_7$. The candidate voltage vector group $VV_g$ corresponding to $V_7$ are four different voltage vectors, for example $[V_6\ V_7\ V_8\ V_4]$ as provided in Table 2. In other words, the optimal voltage vector must again be at least one selected from the candidate voltage vector $[V_6\ V_7\ V_8\ V_4]$ for the next sampling periods. Accordingly, the controller 106 identifies the group of voltage vector $VV_g$ as $[V_6\ V_7\ V_8\ V_4]$ from the lookup table 126 corresponding to the selected non-zero voltage vector $V_7$.

Considering both examples 1 and 2, the controller 106 selects four candidate voltage vectors Vg from sixty-four voltage vectors mapped to $\alpha\beta$ and xy frames corresponding to sixty-four possible switching states of the six-phase inverter 104.

The controller 106 implements a predefined mathematical equation (Cost function) for computing a cost function $g(V_s)$ as given in equation 14, in order to identify a voltage vector out of 4 identified candidate voltage vectors in either example 1 or 2, that minimizes the total cost for the predicted future stator current. Here, Vs represents the candidate voltage vectors. In an embodiment, the cost function $g(V_s)$ calculates a squared error between the predicted future stator current and a reference stator current as below:

$$g(V_s) = (i_\alpha^* - i_\alpha^P)^2 + (i_\beta^* - i_\beta^P)^2 + K_{xy}((i_x^* - i_x^P)^2 + (i_y^* - i_y^P)^2) \quad (14)$$

where the superscripts * and P are used for the reference future stator current values and predicted future stator current values, respectively, $V_s$ represents the applied voltage vector or candidate voltage vector, $K_{xy}$ is a weighting factor which reflects the relative priority of $\alpha\beta$ components (flux and torque tracking) against the xy components as a current distortion. In an embodiment, the weighing factor is a value selected from a range of 0.01 up to 0.2 that corresponds to control the current in xy orthogonal subspace.

The controller 106 evaluates the value of cost function $g(V_s)$ as defined in equation 14 for each of the plurality of CVVs, i.e., $[V_{16}\ V_5\ V_6\ V_1]$ for the first example or $[V_6\ V_7\ V_8\ V_4]$ for the second example, as explained earlier regarding Table 1 and Table 2, particularly in a certain embodiment of the present disclosure, The controller 106 evaluates the cost function as given in equation (14) to identify plurality of cost function results i.e. at a first voltage vector $V_{16}$, a second voltage vector $V_5$, a third voltage vector $V_6$ and a fourth voltage vector $V_1$ (zero-voltage vector) corresponding to $V_{old}$ voltage vector for the first example to compute the squared error between the predicted future stator current (for example $i^P\alpha$, $i^P\beta$, $i^Px$ and $i^Py$) and a reference stator current (for example. $i*\alpha$, $i*\beta$, $i*x$ and $i*_y$) as in eq 14. Similarly, for the second example, the controller 106 evaluates the cost function results as given in eq 14 to identify plurality of cost function results i.e., at the fifth voltage vector $V_6$, a sixth voltage vector $V_7$, a seventh voltage vector $V_8$ and an eighth voltage vector $V_4$ (zero-voltage vector) corresponding to $V_{NZ}$ for the second example to compute the squared error between the predicted future stator current (for example $i^P\alpha$, $i^P\beta$, $i^Px$ and $i^Py$) and a reference stator current (for example. $i*\alpha$, $i*\beta$, $i*x$ and $i*_y$).

Once the controller 106 iteratively computes the cost function results for plurality of candidate voltage vectors as provided in equation 14 corresponding to the $V_{16}$, $V_5$, $V_6$ and $V_1$, for the first example, or $V_6$, $V_7$, $V_8$ and $V_4$, for the second example, the controller 106 simultaneously computes equation 16 to identify the minimum value of the cost function for the four CVVs given by the $VV_g$ selected, as below:

$$V_{s-opt} = \underset{\{v_g\}}{\mathrm{argmin}} g(V_s) \quad (15)$$

The minimum value of the cost function for the four CVVs is determined based on equation 15. For example, the controller 106 identifies that the voltage vector $V_6$ provides the minimum value of the cost function in case of example 1 or the voltage vector $V_7$ provides the minimum value of the cost function in case of example 2. Then, a voltage vector corresponding to the minimum value of the cost function, is identified as a primary voltage vector to be applied in the next sample period. For example, Voltage vector $V_6$ is selected as a primary or a future voltage vector that would provide a minimum of the calculated plurality of cost function results for the future or next control sample in case of Example 1 or Voltage vector $V_7$ is selected as a primary or a future voltage vector that would provide a minimum of the calculated plurality of cost function results for the future or next control sample in case of Example 2. The controller thus saves the future voltage vector $V_6$ in case of first example, or $V_7$ in case of second example, as an optimal voltage vector to be used as an input to the lookup table 126 for the next control sample. Based upon the identified optimum voltage vector ($V_6$ in first example or $V_7$ in second example), that's acts as a switching state of the inverter 104, plurality of current values in αβ and xy frames of the 6PIM is controlled by applying the future control sample ($V_6$ in first example or $V_7$ in second example) as a switching state of the six-phase inverter 104. Accordingly, the controller 106 need not process all 13 voltage vectors to identify the future or the next voltage vector however, only 4 voltage vectors need to be processed. Thus, evaluating only four VVs in Vg during the optimization step reduces the computation time.

The predictive current control method executed by the controller 106 requires only one commutation to move from one VV to its previous or following one. Also, one of the four redundant zero VV is selected that ensures that only one commutation is required if a zero VV is to be selected among the candidate Vg. In an embodiment, control sample with up to one commutation of the set of switches of the 2-level six-phase inverter 104 is identified. Accordingly, switching frequency is considerably minimized.

Figure 4:
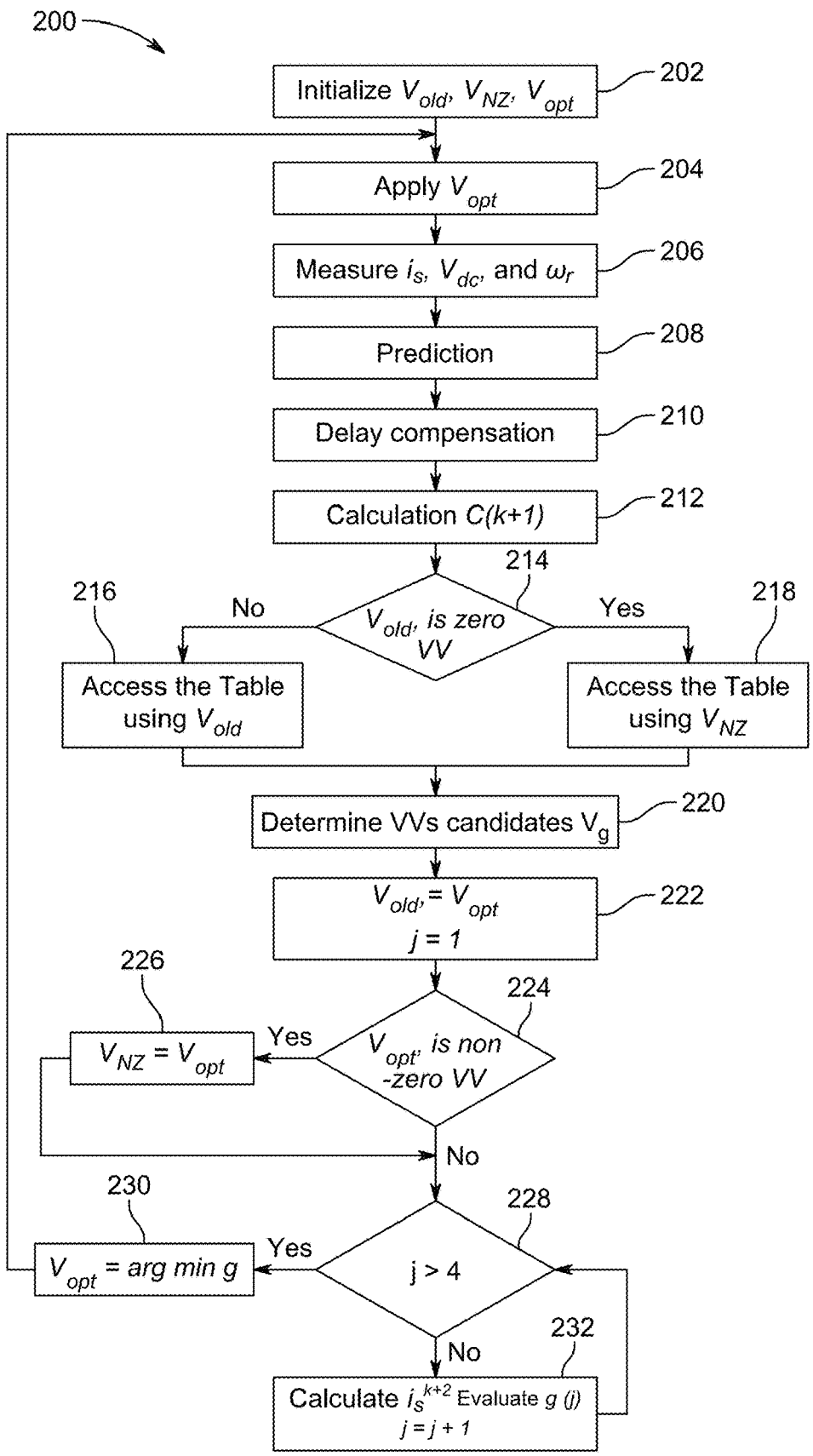
FIG. 4 illustrates an exemplary flowchart of main steps of the method of predictive current control for six-phase induction motor driven by six-phase inverter, according to certain embodiments.

FIG. 4 illustrates an exemplary flowchart 200 of main steps of the method of predictive current control for six-phase induction motor driven by six-phase inverter, according to an embodiment. As described with FIG. 1 in a block 202, an initial value of $V_{old}$, $V_{NZ}$ and $V_{opt}$ is initialized. In an embodiment, the initial values are predefined in the lookup table 126. In block 204, the initial optimum value of the voltage vector is selected and applied as input to the 2L-six phase inverter 104. Block 206 describes the measuring stator current $i_s$, rotor speed $\omega_r$ and possible $V_{dc}$ value. According, a set of rotor variables (iq* and id*) of the 6PIM 102 is identified using a difference between the measured rotor speed $\omega_r$ and a reference rotor speed $\omega_r*$. Based upon the stator current $i_s$ and rotor speed $\omega_r$, a block 208 is configured to predict future stator current for a future control sample of the 6PIM 102 based on the transformed set of orthogonal subspace current values, estimated set of rotor variables, and the measured rotor speed. A Block 210 compensates for the time delay caused by the calculation process. A block 212 computes future control sample ($C_{K+1}$) using equation 12 and 13 as described earlier. As such, values of one step ahead of stator currents is are predicted using system model provided in Eq. 6-13.

A block 214 selects a non-zero voltage vector from at least one of the present voltage vectors if the present voltage vector is non-zero and a last appeared nonzero voltage vector from the lookup table 126. If the present voltage vector is same as a last appeared voltage vector and a non-zero VV as appeared during the last optimal voltage vector selection, a block 218 indicates to access the lookup table 126 using the non-zero VV as $V_{old}$. If the present voltage vector is a zero VV as appeared during the last optimal voltage vector selection, a block 216 indicates to access the lookup table 126 using the last active (non-zero) optimal VV referred here as $V_{NZ}$ that was selected as an optimal voltage vector at one step one earlier before the application of the zero-voltage vector for the next step.

Based upon the selection of the voltage vector as either $V_{old}$ or $V_{NZ}$, a block 220 indicates to determine candidate voltage vectors $V_g$ corresponding to $V_{old}$ or $V_{NZ}$ as described in Table 1 and Table 2. The candidate voltage vectors $V_g$ includes four voltage vectors. Block 222 indicates to initialize optimum voltage vector as $V_{old}$. Block 224 and 226, 228 and 232 in combination indicate to compute the cost function $g(V_s)$ iteratively at each candidate voltage vector Vg to compute the squared error between the predicted future stator current (for example $i^P\alpha$, $i^P\beta$, $i^Px$ and $i^P_y$) and a reference stator current (for example. $i*\alpha$, $i*\beta$, $i*x$ and $i*_y$) as per equation 14. Block 230 indicates the identify of a voltage vector $V_{opt}$ corresponding to the minimum value of the cost function result as a primary voltage vector to be applied in the next sample period that is fed back to the block 204 as a loop.

Figure 5A:
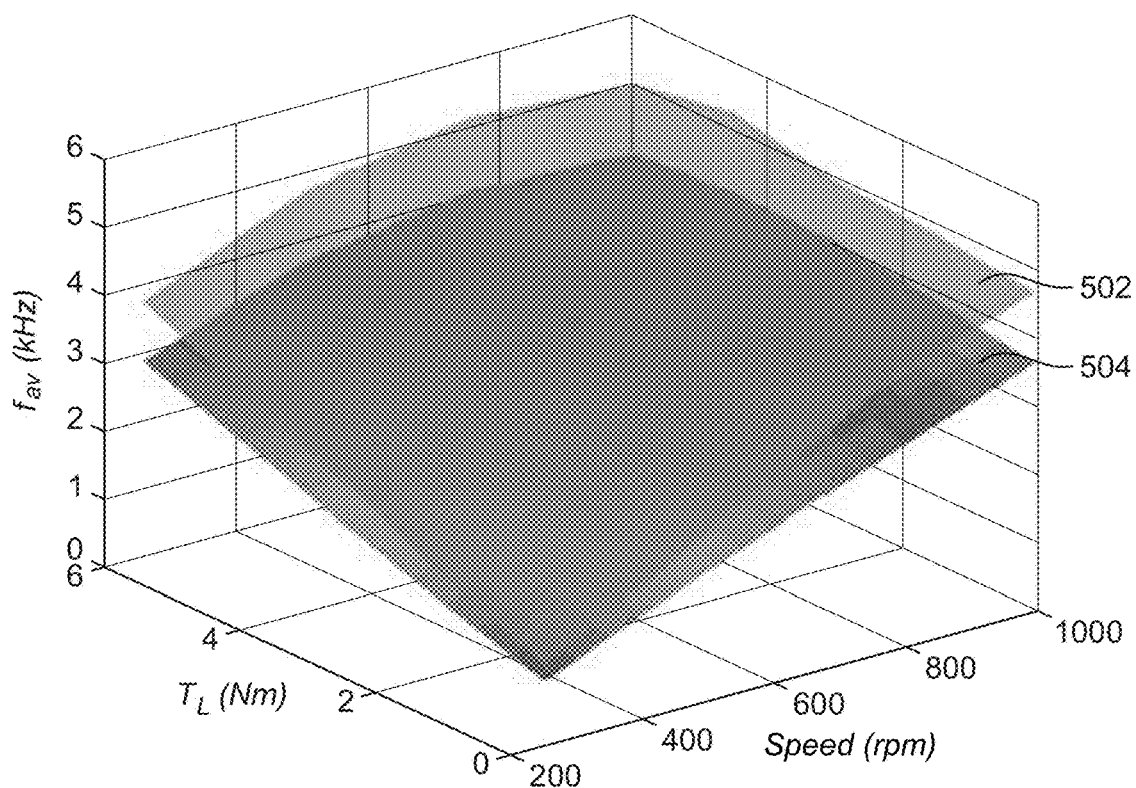
FIG. 5A illustrates a comparison between conventional and proposed predictive current control (PCC) methods based on average switching frequency, according to certain embodiments.

FIG. 5A illustrates a comparison between conventional and proposed PCC methods based on average switching frequency, according to an exemplary embodiment. A third plot 502 and a fourth plot 504 illustrates the switching frequency pattern with respect to speed of the rotor and the torque for the convention method and the proposed PCC method, respectively. It is evident that there is an observable reduction in the switching frequency in the proposed PCC method.

Figure 5B:
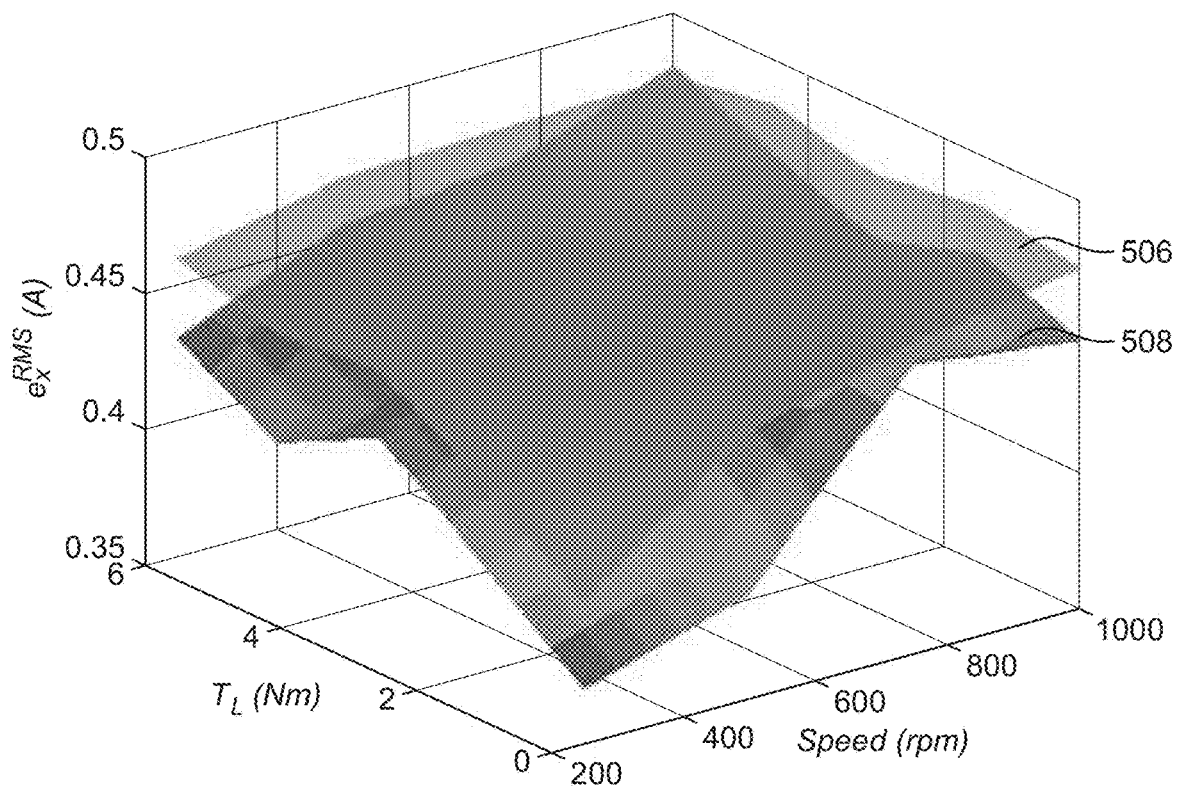
FIG. 5B illustrates a comparison between conventional and proposed predictive current control (PCC) methods based on the root mean square (RMS) error of x current, according to certain embodiments.

FIG. 5B illustrates a comparison between conventional and proposed PCC methods based on the root mean square (RMS) error of x current, according to an exemplary embodiment. A fifth plot 506 and a sixth plot 508 illustrates a pattern of RMS tracking error of $i_x$ current component with respect to speed of the rotor and the torque for the convention method and the proposed PCC method, respectively. It is evident that there is an observable reduction in the circulating current using the proposed PCC method compared to the conventional method.

Figure 6:
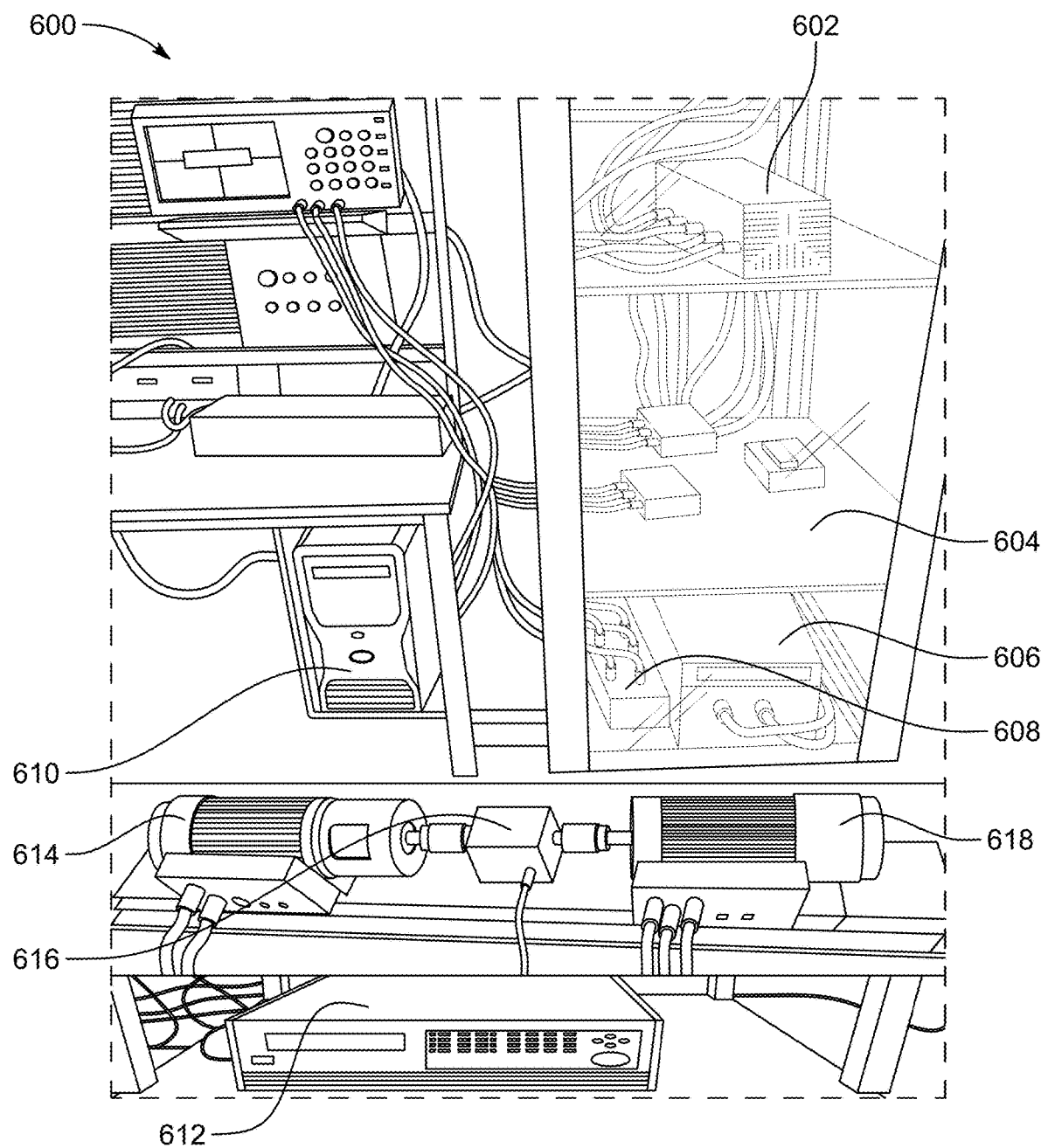
FIG. 6 illustrates an experimental setup used to demonstrate the dynamic and steady-state analysis of an electric drive system, according to certain embodiments.

FIG. 6 illustrates an experimental set up 600 used to demonstrate the dynamic and steady state analysis of an electric drive system, according to an embodiment of the present disclosure compared with the conventional approach. The predictive current control method is thus performed utilizing a computer module as shown in the experimental setup 600. The experimental set up 600 was constructed based on FIG. 1. A six-phase induction motor (6PIM) 618 with 1 kw output power having rating and parameters as listed in Table 3 and Table 4, respectively, was mechanically attached to a 0.75 KW DC generator 614. The DC generator 614 acted as a load. Terminals of the DC generator 614 were connected to a chroma programmable electronic load 612 to give a controlled load to the 6PIM 618. The 6PIM 618 was fed by a controlled 2L-VSI 602 from SEMKRON inverter (manufactured by Danfoss, Baltimore, MD) connected with ±15 V DC supply 606. The PCC technique as described in FIG. 1 and FIG. 4 was implemented in real time using dSPACE 1103 (1 GHz) terminal box platform 608 (manufactured by dSPACE, 50131 Pontiac Trail Wixom, MI, USA 48393-2020) and a host computer 610. The sampling time for all algorithm was set to 40 usec. The rotor angular speed was measured using a 1024 pulse per revolution incremental encoder 616. LEM current and voltage sensors 604 were used for measuring the six-phase currents and DC link voltage, respectively.

TABLE 3

Prototype machine specifications

| Specification | Value |
|---|---|
| Rated RMS phase Voltage (V) | 110 V |
| Rated Power (kW) | 1 |
| Rated RMS phase current (A) | 2.2 |
| Rated frequency (Hz) | 60 |
| No. of poles | 6 |
| Rated speed (RPM) | 1140 |

TABLE 4

Prototype machine parameters

| Parameter (VSD) | Values |
|---|---|
| $R_s$ | 3.1 Ω |
| $R_r$ | 1.94 Ω |
| $L_{ls}$ | 2.05 mH |
| $L_{lr}$ | 6.6 mH |
| $L_{lm}$ | 10.4 mH |
| $L_m$ | 123.4 mH |

FIG. 7A illustrates starting response as a dynamic response of the electric drive system 100 from standstill to 1100 rpm at no-load for conventional method using 13 voltage vectors, according to an embodiment. A PI speed controller was utilized at the time of experimenting. Also, the $K_{xy}$ values were set to 0.2 and 0.05 and tuned to minimize xy currents to best values maintaining good tracking characteristics. In the experiments, in order to demonstrate dynamic characteristics, a step change in the rotor angular speed command from 0 to 1100 rpm was applied. A seventh plot 702 indicates a rotation speed of the 6PIM with respect to time. The transient response settled down at about 0.2 seconds.

FIG. 7B illustrates starting response as a dynamic response of the electric drive system 100 for a stator current at no-load for conventional method using 13 voltage vectors, according to an embodiment. Same PI controller 116 was utilized at the time of experiment. Also, the $K_{xy}$ values were set to 0.2 and 0.05 and tuned to minimize xy currents to best values maintaining good tracking characteristics. With the applied step change in the rotor angular speed command from 0 to 1100, an eighth plot 704 indicates the transient occurred in the stator current. Here again the transients in the stator current settled down before about 0.2 seconds.

Figure 7C:
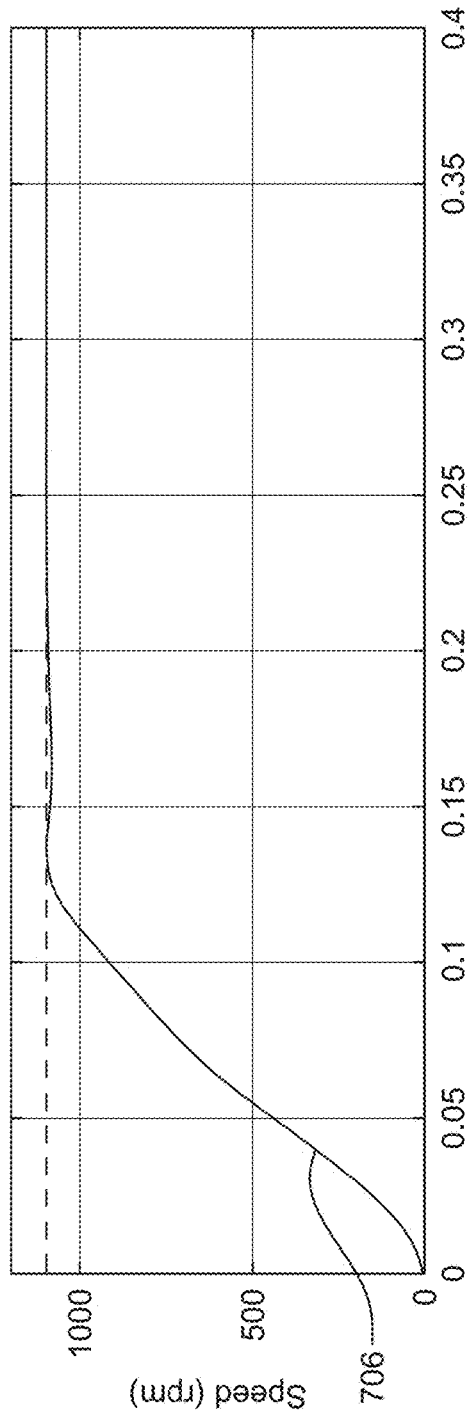
FIG. 7C illustrates starting response as a dynamic response of the electric drive system from standstill to 1100 rpm at no-load for the proposed predictive current control (PCC) method using 4 voltage vectors, according to certain embodiments.

FIG. 7C illustrates starting response as a dynamic response of the electric drive system 100 from standstill to 1100 rpm at no-load for the proposed method using 4 voltage vectors, according to an embodiment. Similar experimental characteristics as in FIG. 1A was stablished. A ninth plot 706 indicates a rotation speed of the 6PIM with respect to time. The transient response was again found to be settled down at about 0.2 seconds.

Figure 7D:
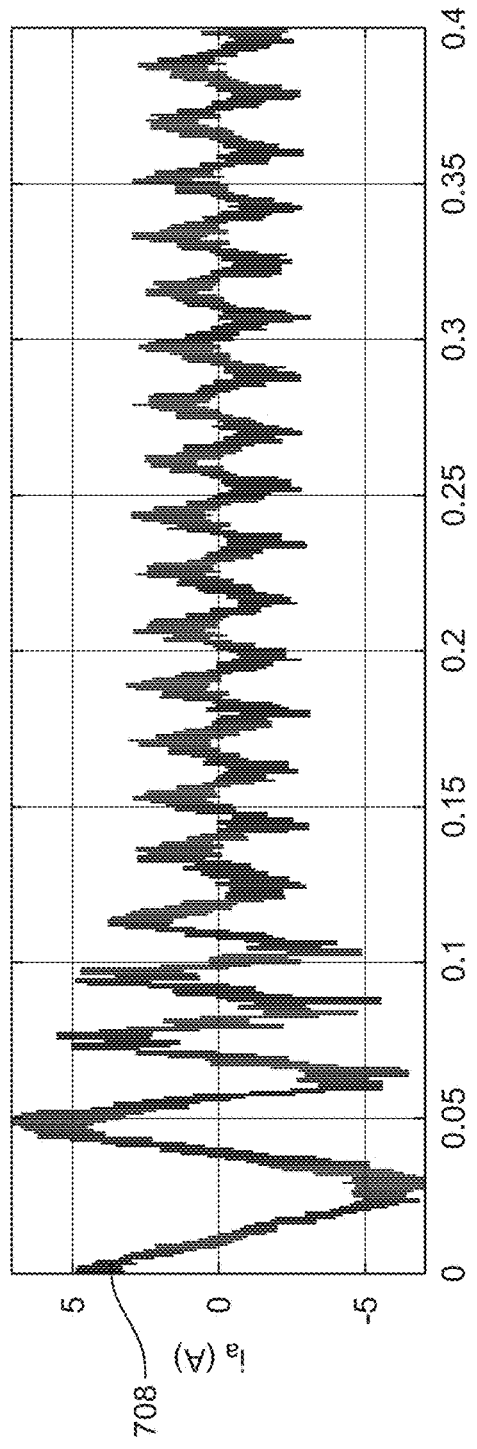
FIG. 7D illustrates starting response as a dynamic response of the electric drive system for a stator current at no-load for the proposed predictive current control (PCC) method using 4 voltage vectors, according to certain embodiments.

FIG. 7D illustrates starting response as a dynamic response of the electric drive system 100 for a stator current at no-load for the proposed method using 4 voltage vectors, according to an embodiment. With again similar conditions as in FIG. 7B, a tenth plot 708 indicates the transient occurred in the stator current. Here again the transients in the stator current settles down before about 0.2 seconds.

Considering FIGS. 7A, 7B, 7C and 7D, it was observed that both methods have similar transient response and settles down at about 0.2 seconds.

Figure 8A:
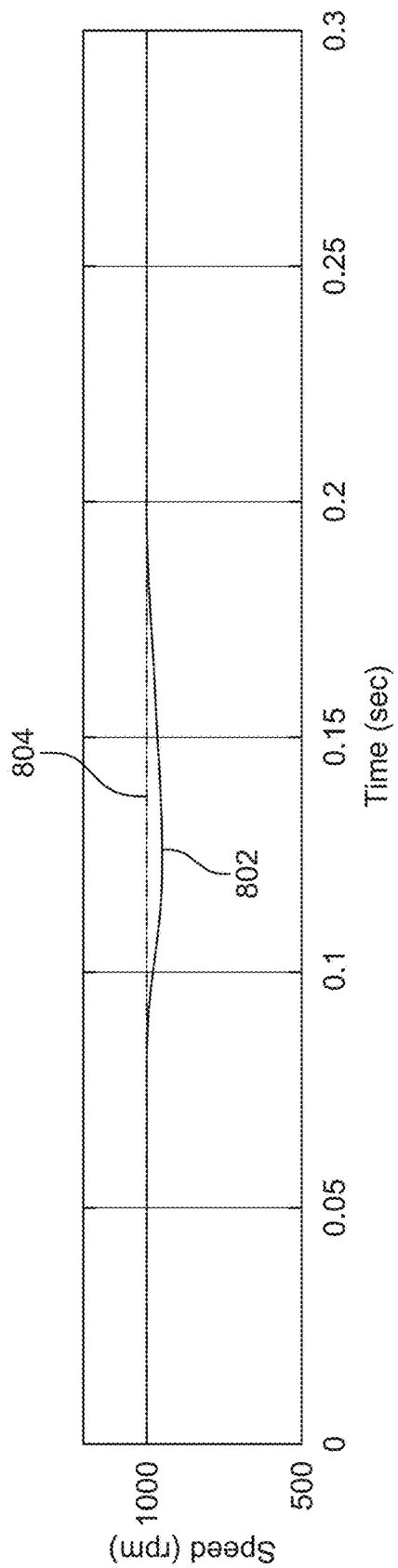
FIG. 8A illustrates a loading response of the electric drive system for conventional predictive current control (PCC) method using 13 voltage vectors for rotation speed, according to certain embodiments.

FIG. 8A illustrates a loading response of the electric drive system 100 for conventional method using 13 voltage vectors for rotation speed, according to an embodiment. A sudden load of 3 Nm was applied to the A6PIM while running at 1000 rpm. An eleventh plot 802 indicates a rotation speed of the 6PIM 102 with respect to time. A twelfth plot 804 indicates a reference rotor speed $\omega_r^*$.

Figure 8B:
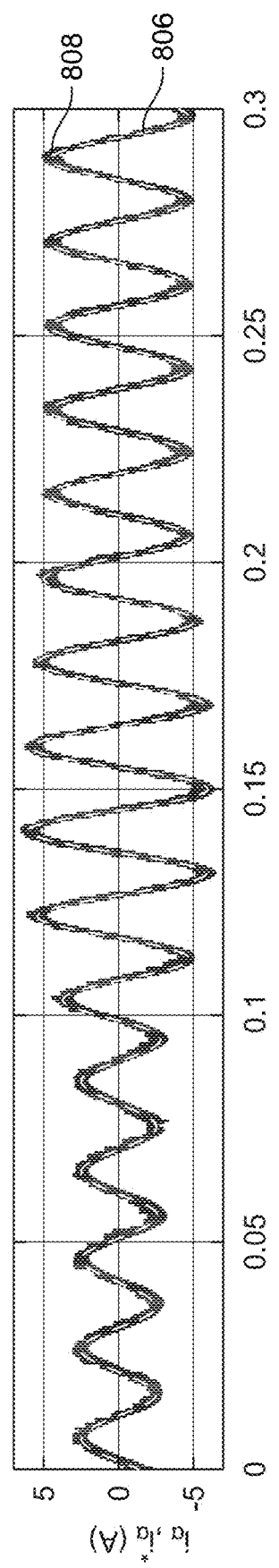
FIG. 8B illustrates a loading response of the electric drive system for conventional predictive current control (PCC) method using 13 voltage vectors for subspace currents $i_\alpha$, according to certain embodiments.

FIG. 8B illustrates a loading response of the electric drive system 100 for conventional method using 13 voltage vectors for subspace currents $i_\alpha$, according to an embodiment. A thirteenth plot 806 indicates a pattern of subspace current $i_\alpha$, through the 6PIM 102 with respect to time. A fourteenth plot 808 indicates a reference subspace current $i_\alpha$.

Figure 8C:
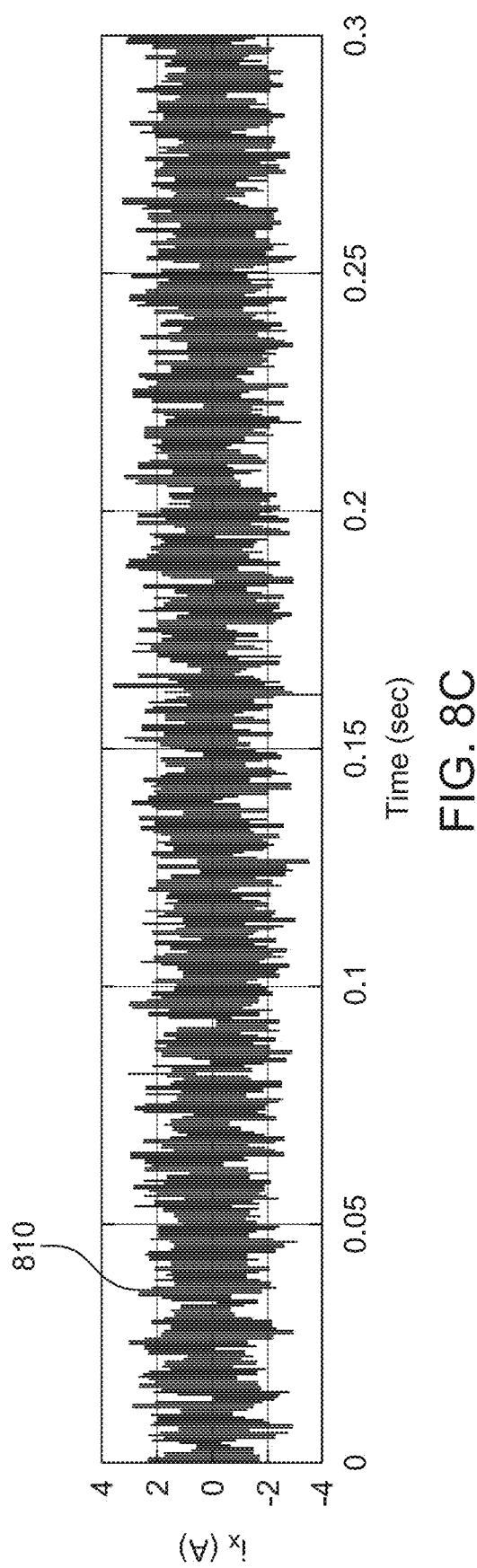
FIG. 8C illustrates a loading response of the electric drive system for conventional predictive current control (PCC) method using 13 voltage vectors for subspace currents $i_x$, according to certain embodiments.

FIG. 8C illustrates a loading response of the electric drive system 100 for conventional method using 13 voltage vectors for subspace currents $i_x$, according to an embodiment. A fifteenth plot 810 indicates a pattern of subspace current $i_x$, through the 6PIM 102 with respect to time.

Figure 8D:
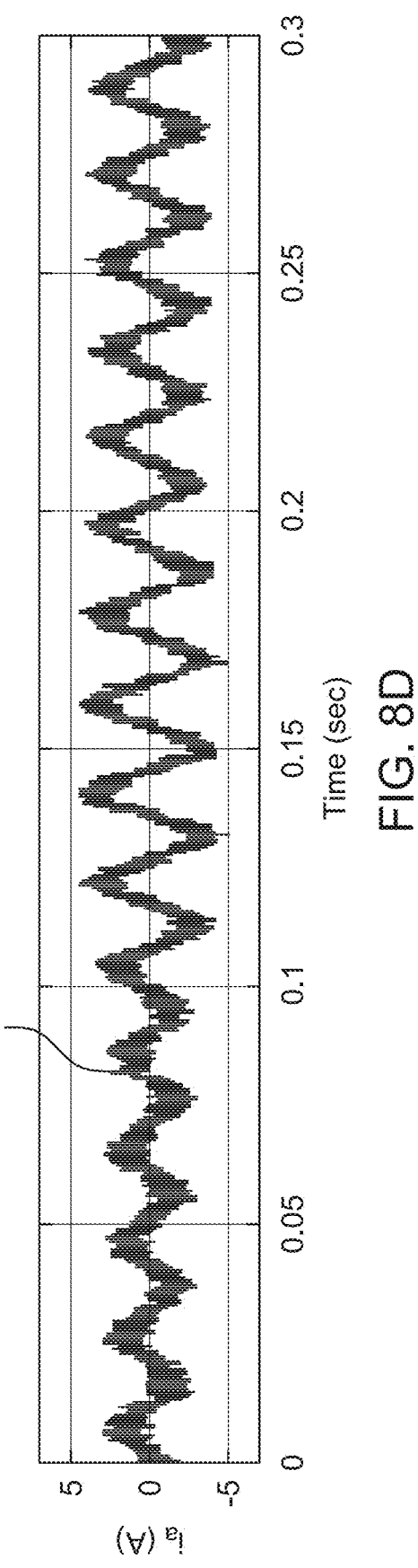
FIG. 8D illustrates a loading response of the electric drive system for conventional predictive current control (PCC) method using 13 voltage vectors for phase currents $i_a$, according to certain embodiments.

FIG. 8D illustrates a loading response of the electric drive system 100 for conventional method using 13 voltage vectors for phase currents $i_a$, according to an embodiment. A sixteenth plot 812 indicates a pattern of phase current $i_a$, through the 6PIM 102 with respect to time.

Figure 8E:
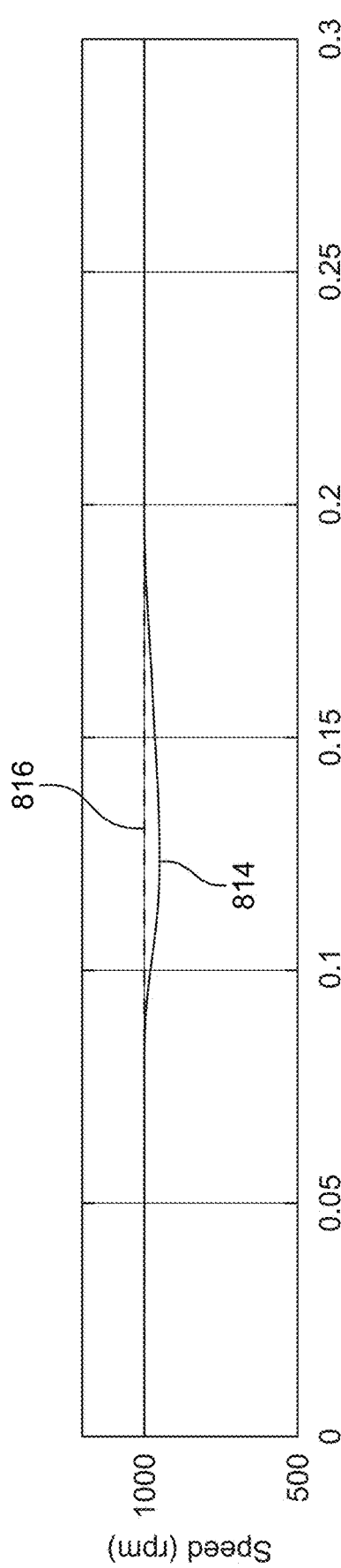
FIG. 8E illustrates a loading response of the electric drive system for the proposed predictive current control (PCC) method using 4 voltage vectors for rotation speed, according to certain embodiments.

FIG. 8E illustrates a loading response of the electric drive system 100 for the proposed method using 4 voltage vectors for rotation speed, according to an embodiment. A sudden load of 3 Nm was again applied to the A6PIM while running at 1000 rpm. A seventeenth plot 814 indicates a rotation speed of the 6PIM 102 with respect to time. An eighteenth plot 816 indicates a reference rotor speed.

Figure 8F:
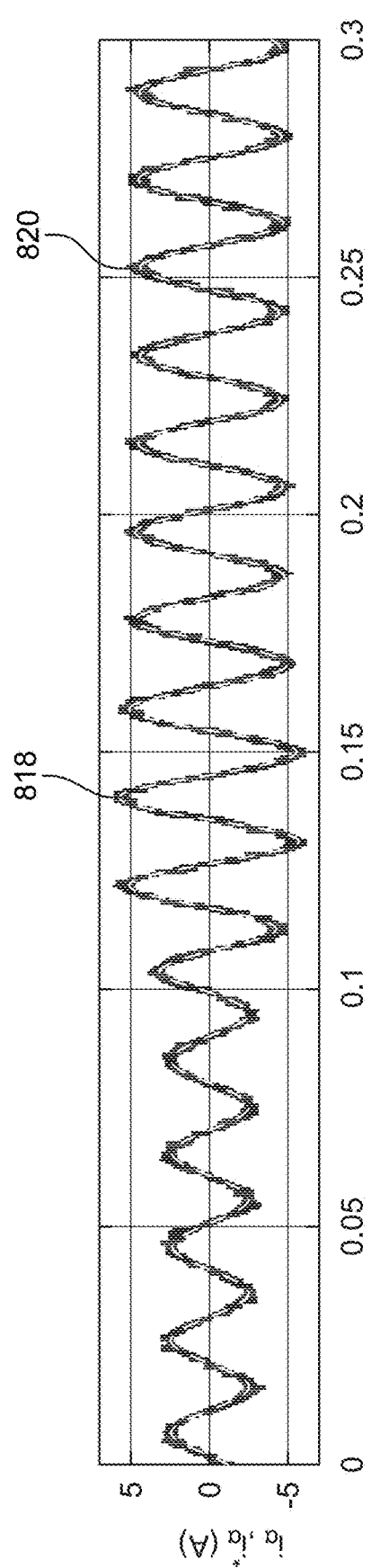
FIG. 8F illustrates a loading response of the electric drive system for the proposed predictive current control (PCC) method using 4 voltage vectors for subspace currents $i_\alpha$, according to certain embodiments.

FIG. 8F illustrates a loading response of the electric drive system 100 for the proposed method using 4 voltage vectors for subspace currents $i_\alpha$, according to an embodiment. A nineteenth plot 818 indicates a pattern of subspace current $i_\alpha$, through the 6PIM 102 with respect to time. A twentieth plot 820 indicates a reference subspace current $i_\alpha$.

Figure 8G:
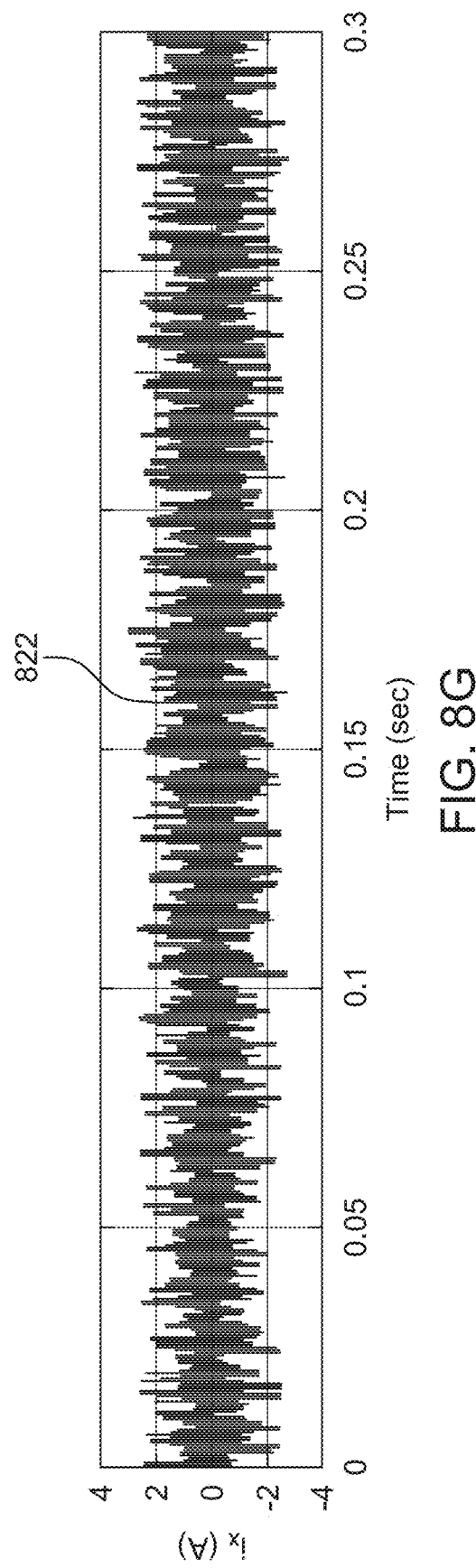
FIG. 8G illustrates a loading response of the electric drive system for the proposed predictive current control (PCC) method using 4 voltage vectors for subspace currents $i_x$, according to certain embodiments.

FIG. 8G illustrates a loading response of the electric drive system 100 for the proposed method using 4 voltage vectors for subspace currents $i_x$, according to an embodiment. A twenty-first plot 822 indicates a pattern of subspace current $i_x$, through the 6PIM 102 with respect to time.

Figure 8H:
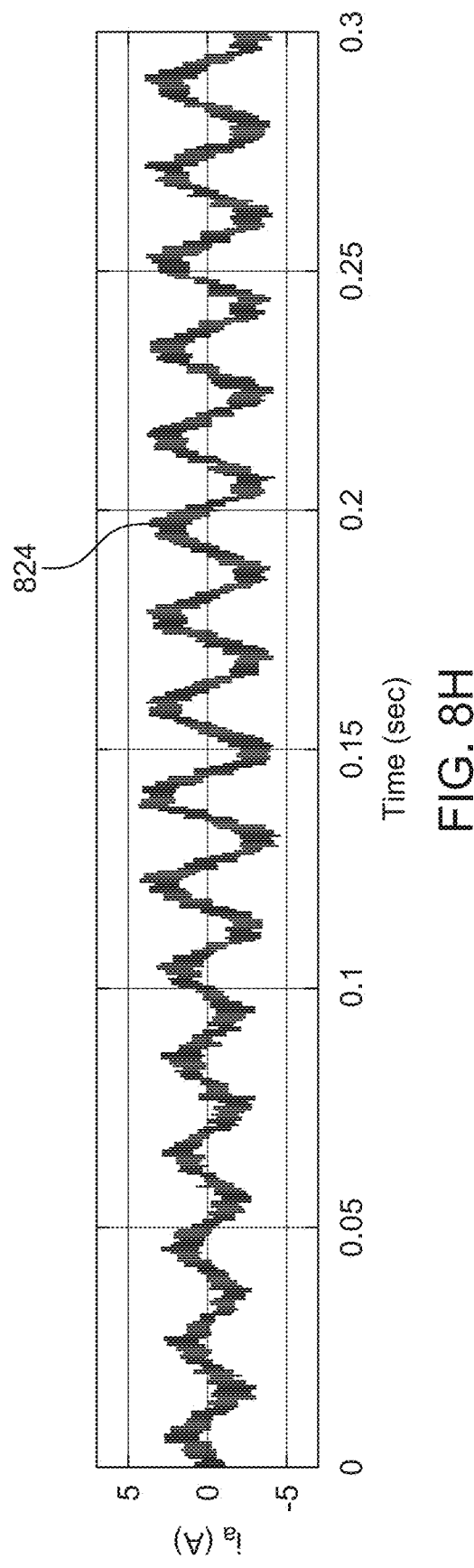
FIG. 8H illustrates a loading response of the electric drive system for the proposed predictive current control (PCC) method using 4 voltage vectors for phase currents $i_a$, according to certain embodiments.

FIG. 8H illustrates a loading response of the electric drive system 100 for the proposed method using 4 voltage vectors for phase currents $i_a$, according to an embodiment. A twenty-second plot 824 indicates a pattern of phase current $i_a$, through the 6PIM 102 with respect to time.

Considering FIG. 8A-8H, it was observed that the speed retained to its reference value after a short transient period for both methods. Further it was noted that $i_\alpha$ in the proposed method using 4 voltage vectors could successfully tracked its reference and the reduction of circulating current $i_x$ was relatively less than the conventional method.

FIG. 9A illustrates a reversing response of the electric drive system 100 for conventional method using 13 voltage vectors for rotation speed, according to an embodiment. For conducting the reversing test, a command speed was changed from 1000 to −1000 rpm. A twenty-third plot 902 indicates a pattern observed in rotation speed $\omega_r^*$ of the 6PIM 102 with respect to time. A twenty fourth plot 904 indicates a reference rotor speed $\omega_r^*$.

FIG. 9B illustrates a reversing response of the electric drive system 100 for conventional method using 13 voltage vectors for subspace currents $i_\alpha$, according to an embodiment. A twenty-fifth plot 906 indicates a pattern of subspace current $i_\alpha$, through the 6PIM with respect to time. A twenty-sixth plot 908 indicates a reference subspace current $i_\alpha$.

FIG. 9C illustrates a reversing response of the electric drive system 100 for conventional method using 13 voltage vectors for subspace currents $i_x$, according to an embodiment. A twenty seventh plot 910 indicates a pattern of subspace current $i_x$, through the 6PIM 102 with respect to time.

FIG. 9D illustrates a reversing response of the electric drive system 100 for conventional method using 13 voltage vectors for phase currents $i_a$, according to an embodiment. A twenty-eighth plot 912 indicates a pattern of phase current $i_a$, through the 6PIM 102 with respect to time.

Figure 9E:
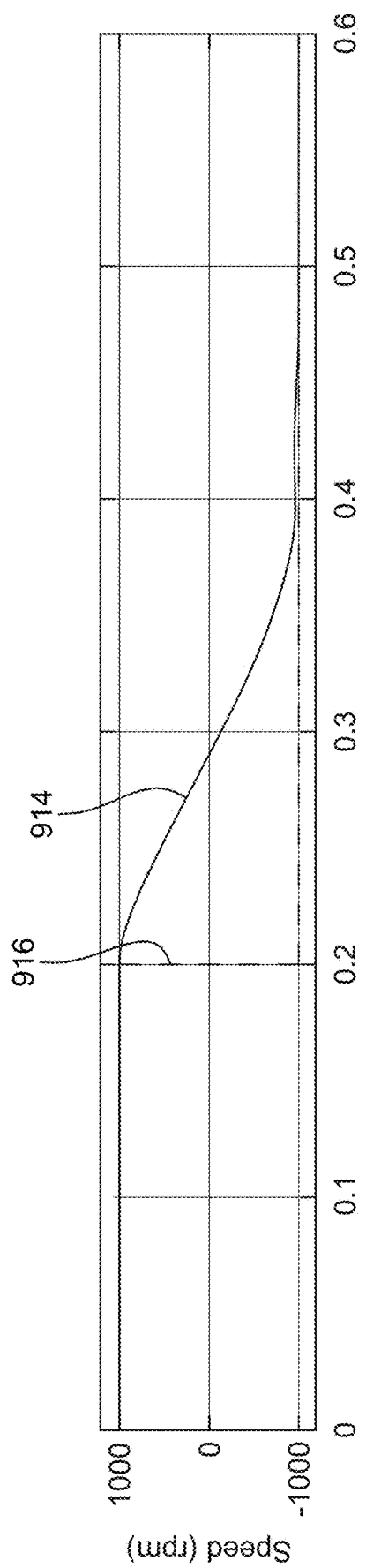
FIG. 9E illustrates a reversing response of the electric drive system for the proposed predictive current control (PCC) method using 4 voltage vectors for rotation speed, according to certain embodiments.

FIG. 9E illustrates a reversing response of the electric drive system 100 for the proposed method using 4 voltage vectors for rotation speed, according to an embodiment. For conducting the reversing test, a command speed was again changed from 1000 to −1000 rpm. A twenty-ninth plot 914 indicates a rotation speed of the 6PIM 102 with respect to time. A thirtieth plot 916 indicates a reference rotor speed $\omega_r^*$.

Figure 9F:
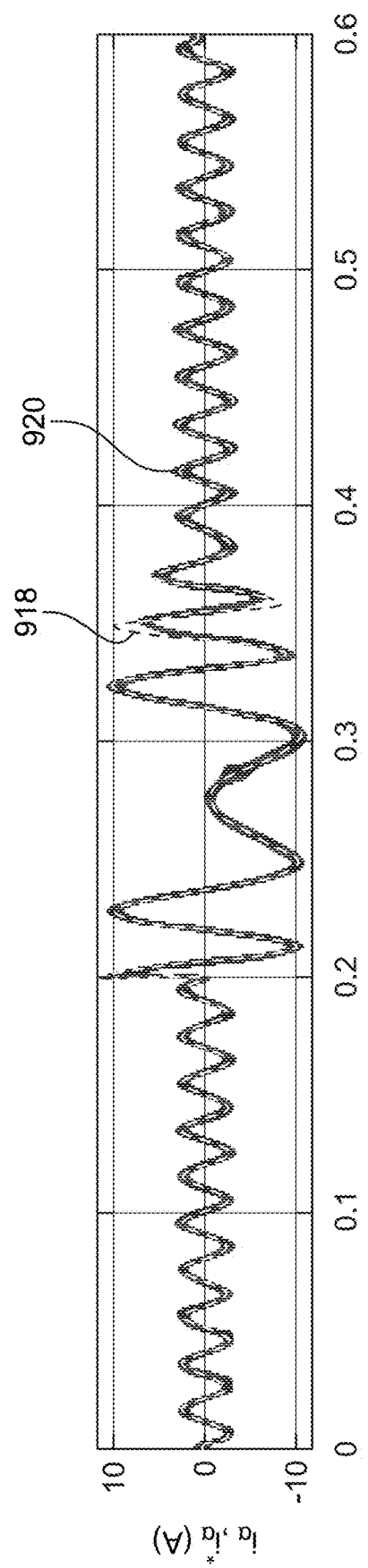
FIG. 9F illustrates a reversing response of the electric drive system for the proposed predictive current control (PCC) method using 4 voltage vectors for subspace currents $i_\alpha$, according to certain embodiments.

FIG. 9F illustrates a reversing response of the electric drive system 100 for the proposed method using 4 voltage vectors for subspace currents $i_\alpha$, according to an embodiment. A thirty-first plot 918 indicates a pattern of subspace current $i_\alpha$, through the 6PIM 102 with respect to time. A thirty-second plot 920 indicates a reference subspace current $i_\alpha$.

Figure 9G:
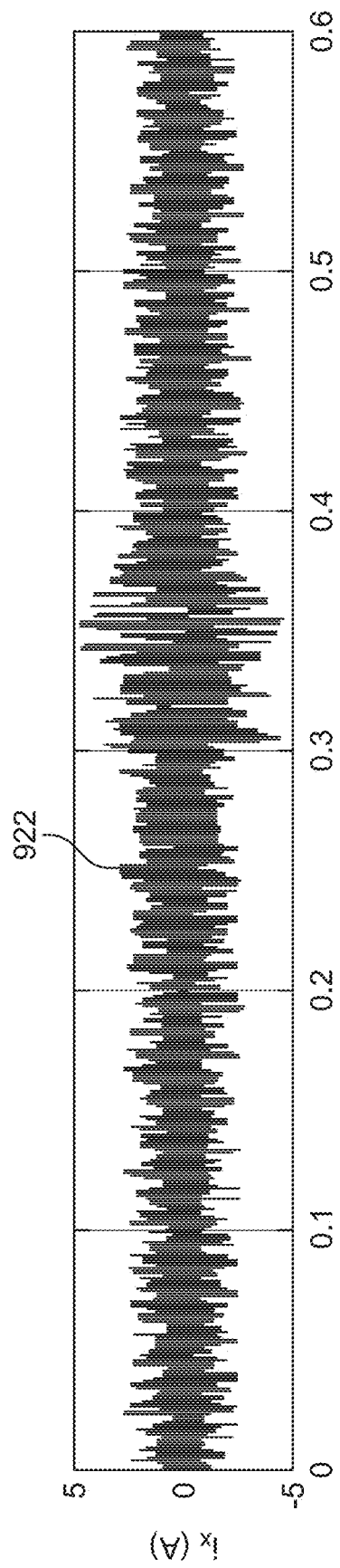
FIG. 9G illustrates a reversing response of the electric drive system for the proposed predictive current control (PCC) method using 4 voltage vectors for subspace currents $i_x$, according to certain embodiments.

FIG. 9G illustrates a reversing response of the electric drive system 100 for the proposed method using 4 voltage vectors for subspace currents $i_x$, according to an embodiment. A thirty-third plot 922 indicates a pattern of subspace current $i_x$, through the 6PIM 102 with respect to time.

Figure 9H:
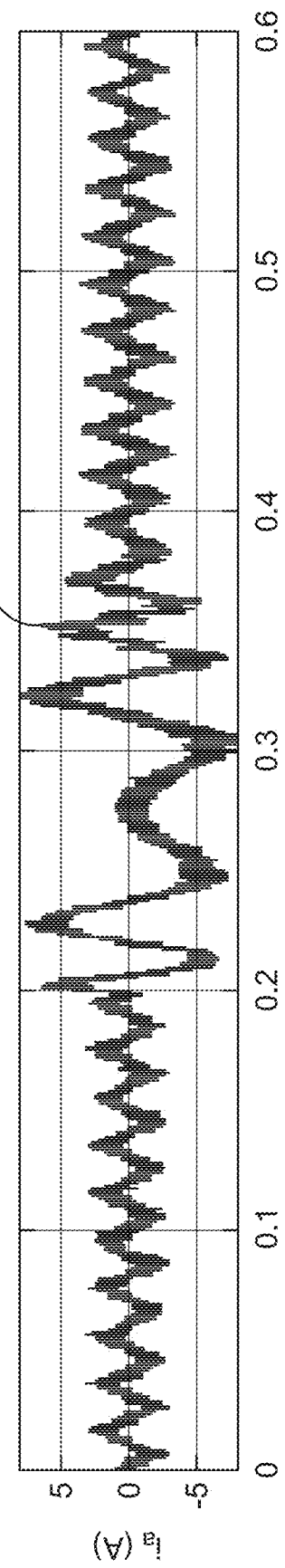
FIG. 9H illustrates a loading response of the electric drive system for the proposed predictive current control (PCC) method using 4 voltage vectors for phase currents $i_a$, according to certain embodiments.

FIG. 9H illustrates a loading response of the electric drive system 100 for the proposed method using 4 voltage vectors for phase currents $i_a$, according to an embodiment. A thirty-fourth plot 924 indicates a pattern of phase current $i_a$, through the 6PIM 102 with respect to time.

Considering FIG. 9A-9H, it was observed that the 6PIM 102 successfully followed the command speed for both methods. However, it was observed that there is a very short time for which the actual $i_\alpha$ could not follows its reference at the end of the reversing period for both methods. This behavior attributed to the high circulating current where the optimization step gave more priority to the reduction of circulating current ($i_x$) than the tracking currents ($i_\alpha$) at this short period.

Figure 10A:
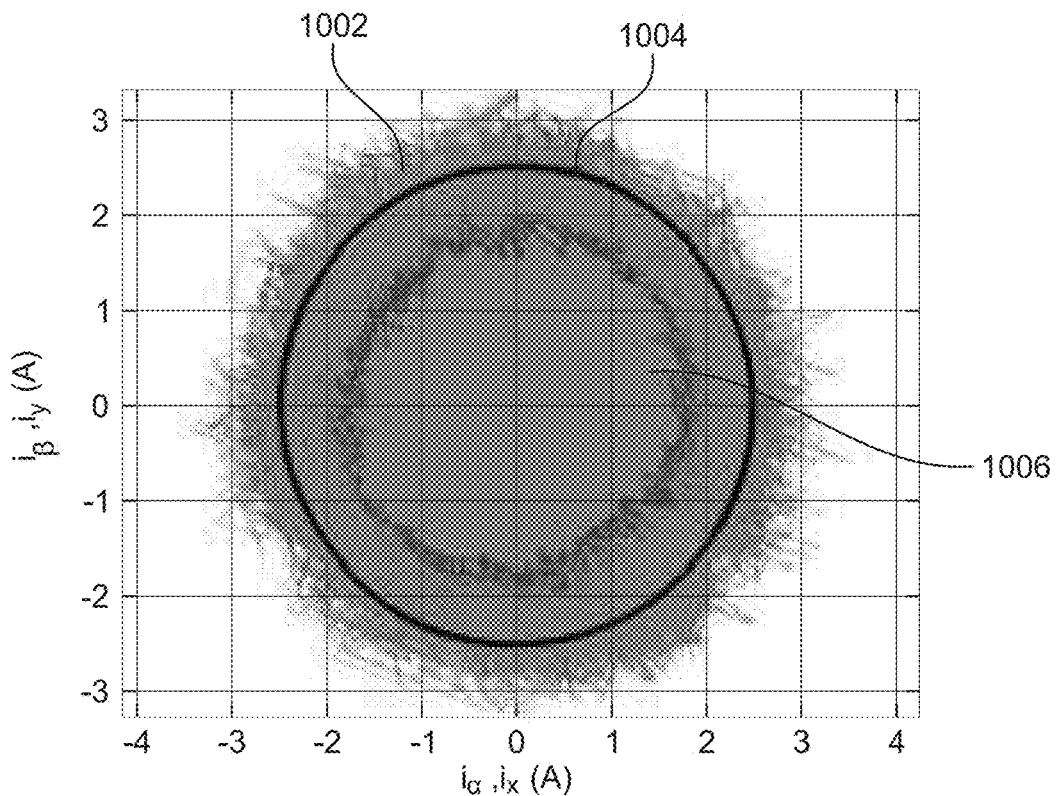
FIG. 10A illustrates a comparative analysis of stator current at 50 rpm and no-load condition for conventional predictive current control (PCC) method using 13 voltage vectors, according to certain embodiments.

FIG. 10A illustrates a comparative analysis of stator current at 50 rpm and no-load condition for conventional method using 13 voltage vectors, according to an embodiment. Current tracking characteristics were observed at different operating conditions. A thirty-fifth plot 1002 indicates a pattern of $i_{\alpha\beta}$ current. A thirty-sixth plot 1004 indicates a pattern of $i_{\alpha\beta}^*$ current. A thirty-seventh plot 1006 indicates a pattern of xy current.

Figure 10B:
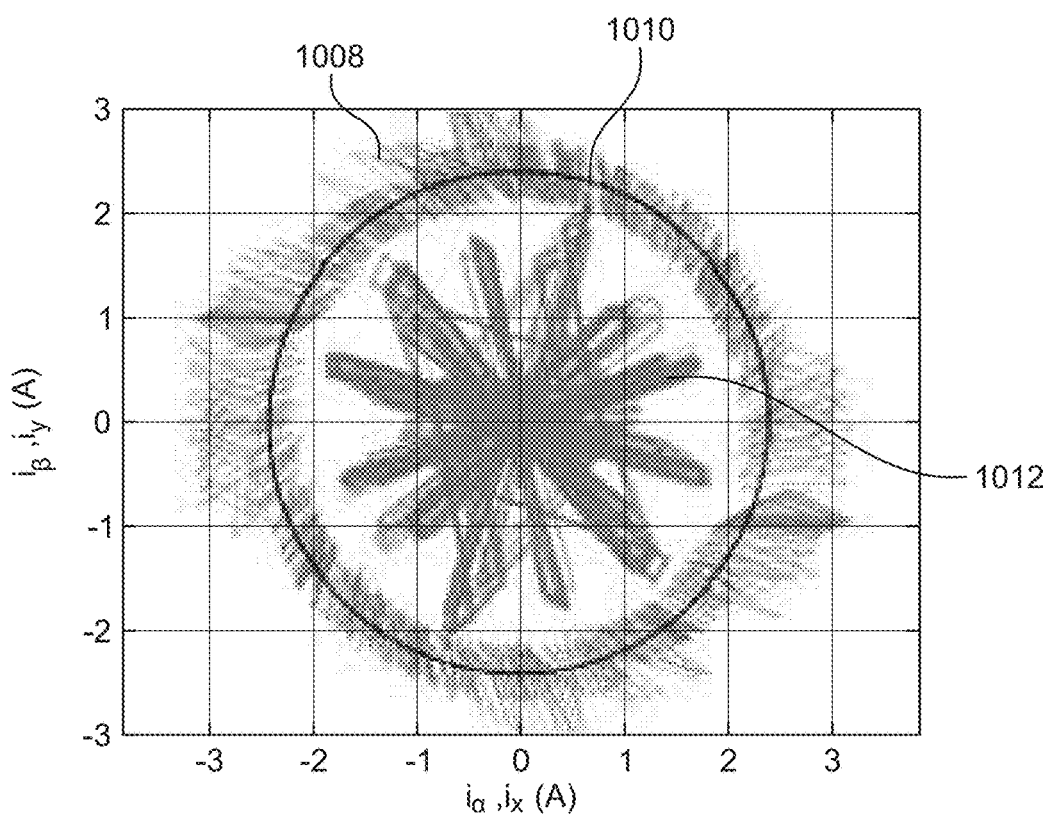
FIG. 10B illustrates a comparative analysis of stator current at 50 rpm and no-load condition for the proposed predictive current control (PCC) method using 4 voltage vectors, according to certain embodiments.

FIG. 10B illustrates a comparative analysis of stator current at 50 rpm and no-load condition for the proposed method using 4 voltage vectors, according to an embodiment. A thirty-eighth plot 1012 indicates a pattern of $i_{\alpha\beta}$ current. A thirty-ninth plot 1010 indicates a pattern of $i_{\alpha\beta}^*$ current. A fortieth plot 1008 indicates a pattern of xy current.

Figure 10C:
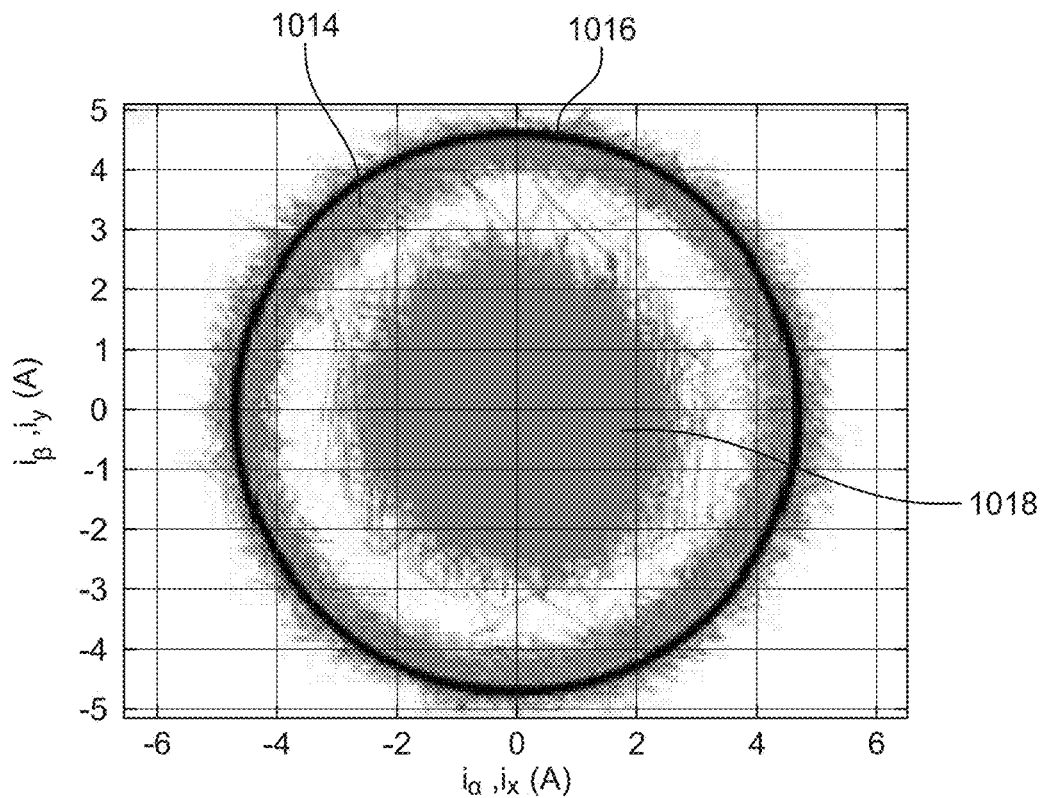
FIG. 10C illustrates a comparative analysis of stator current at 600 rpm and 3 Nm torque for conventional predictive current control (PCC) method using 13 voltage vectors, according to certain embodiments.

FIG. 10C illustrates a comparative analysis of stator current at 600 rpm and 3 Nm torque for conventional method using 13 voltage vectors, according to an embodiment. A forty-first plot 1014 indicates a pattern of $i_{\alpha\beta}$ current. A forty-second plot 1016 indicates a pattern of $i_{\alpha\beta}^*$ current. A forty-third plot 1018 indicates a pattern of xy current.

Figure 10D:
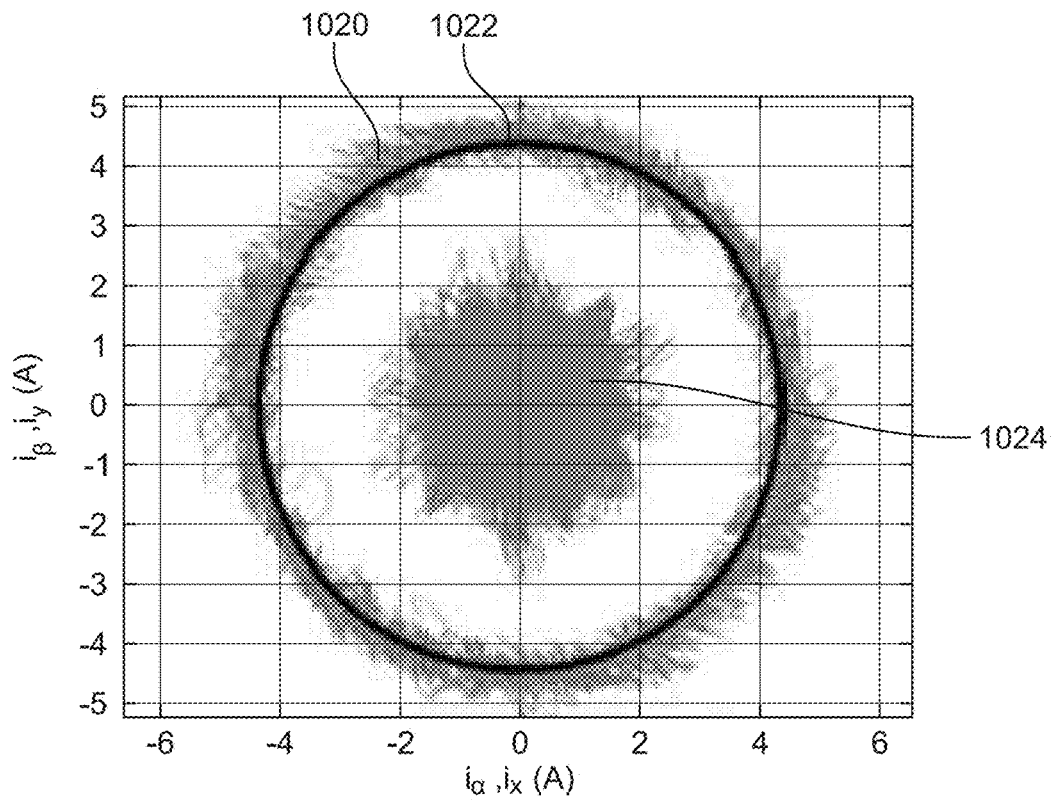
FIG. 10D illustrates a comparative analysis of stator current at 600 rpm and 3 Nm torque for the proposed predictive current control (PCC) method using 4 voltage vectors, according to certain embodiments.

FIG. 10D illustrates a comparative analysis of stator current at 600 rpm and 3 Nm torque for the proposed method using 4 voltage vectors, according to an embodiment. A forty-fourth plot 1024 indicates a pattern of $i_{\alpha\beta}$ current. A forty-fifth plot 1022 indicates a pattern of $i_{\alpha\beta}^*$ current. A forty-sixth plot 1020 indicates a pattern of xy current.

Figure 10E:
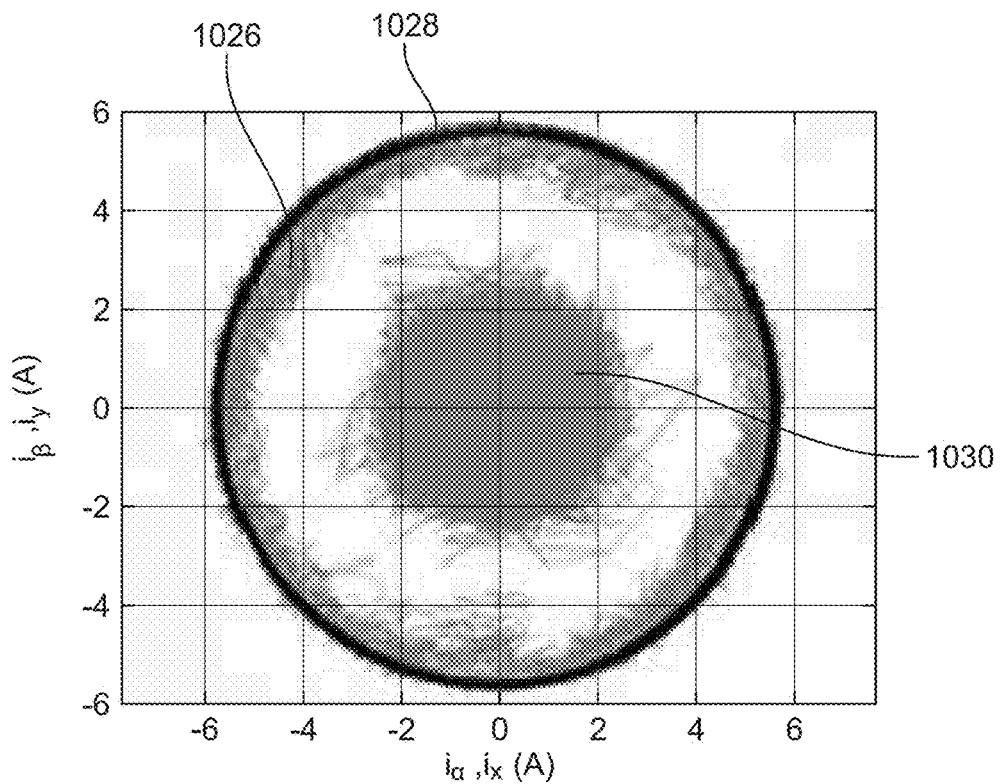
FIG. 10E illustrates a comparative analysis of stator current at 1100 rpm and 4 Nm torque for the conventional predictive current control (PCC) method using 13 voltage vectors, according to certain embodiments.

FIG. 10E illustrates a comparative analysis of stator current at 1100 rpm and 4 Nm torque for conventional method using 13 voltage vectors, according to an embodiment. A forty-seventh plot 1026 indicates a pattern of $i_{\alpha\beta}$ current. A forty-eighth plot 1028 indicates a pattern of $i_{\alpha\beta}^*$ current. A forty-ninth plot 1030 indicates a pattern of xy current.

Figure 10F:
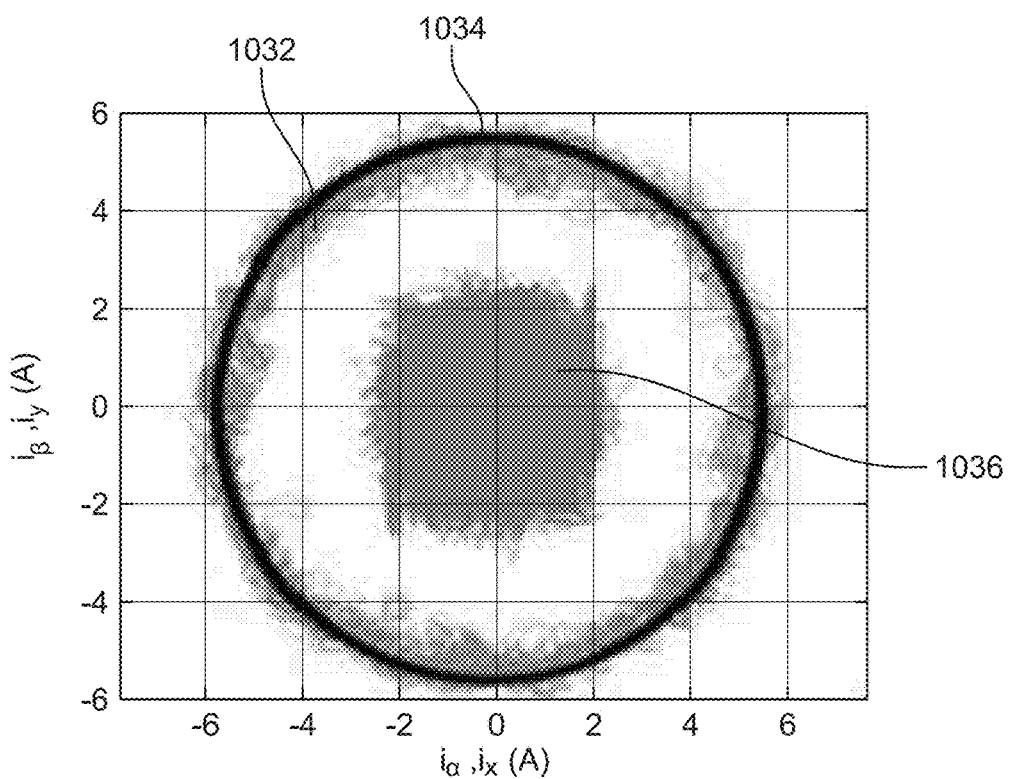
FIG. 10F illustrates a comparative analysis of stator current at 1100 rpm and 4 Nm torque for the proposed predictive current control (PCC) method using 4 voltage vectors, according to certain embodiments.

FIG. 10F illustrates a comparative analysis of stator current at 1100 rpm and 4 Nm torque for the proposed method using 4 voltage vectors, according to an embodiment. A fiftieth plot 1036 indicates a pattern of $i_{\alpha\beta}$ current. A fifty-first plot 1034 indicates a pattern of $i_{\alpha\beta}^*$ current. A fifty-second plot 1032 indicates a pattern of xy current.

Considering FIG. 10A-10F, it was observed that the proposed PCC method is superior to the conventional one specially at low and medium speeds. The ripple in $\alpha\beta$ currents was observed to be significantly reduced in the proposed method. It indicates an improved performance of the proposed PCC method even by using only 4 voltage vectors compared to the convention method of using 13 voltage vectors.

Figure 11A:
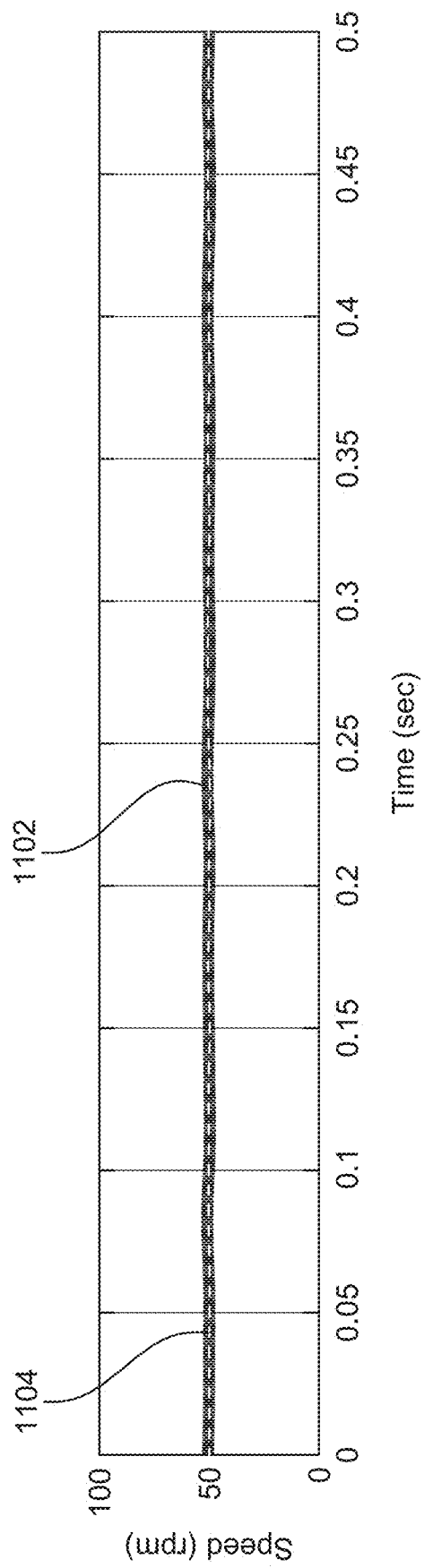
FIG. 11A illustrates a steady state response of the electric drive system at a low speed of 50 rpm and no-load for the conventional predictive current control (PCC) method using 13 voltage vectors, according to certain embodiments.

FIG. 11A illustrates a steady state response of the electric drive system 100 at low speed 50 rpm and no-load for conventional method using 13 voltage vectors, according to an embodiment. A fifth-third plot 1102 indicates a pattern observed in rotation speed $\omega_r$ of the 6PIM 102 with respect to time. A fifth-fourth plot 1104 indicates a reference rotor speed $\omega_r^*$.

Figure 11B:
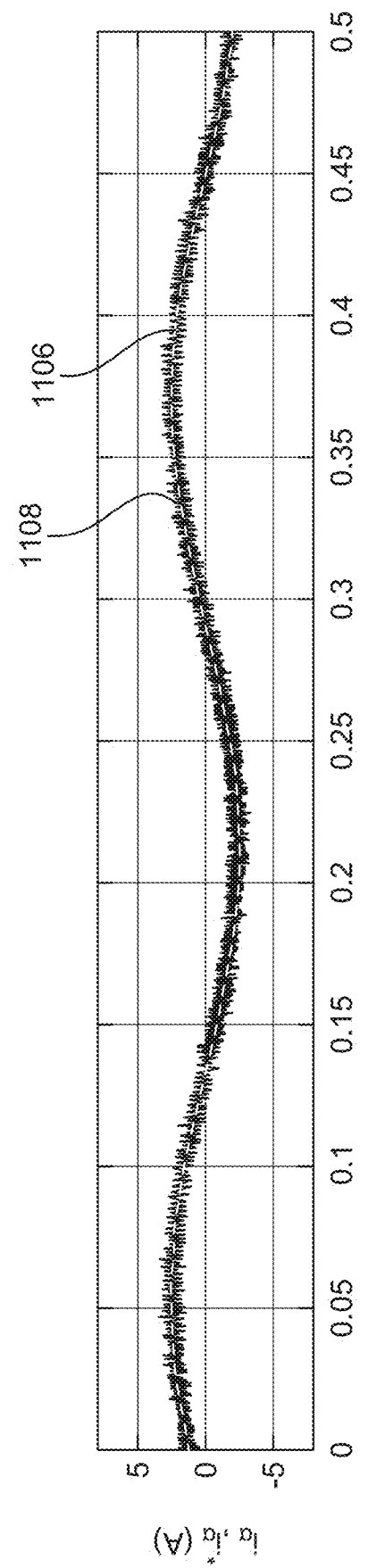
FIG. 11B illustrates a steady state response of the electric drive system for the conventional predictive current control (PCC) method using 13 voltage vectors for subspace currents $i_\alpha$, according to certain embodiments.

FIG. 11B illustrates a steady state response of the electric drive system 100 for conventional method using 13 voltage vectors for subspace currents $i_\alpha$, according to an embodiment. A fifty-fifth plot 1106 indicates a pattern of subspace current $i_\alpha$, through the 6PIM 102 with respect to time. A fifty-sixth plot 1108 indicates a reference subspace current $i_\alpha$.

Figure 11C:
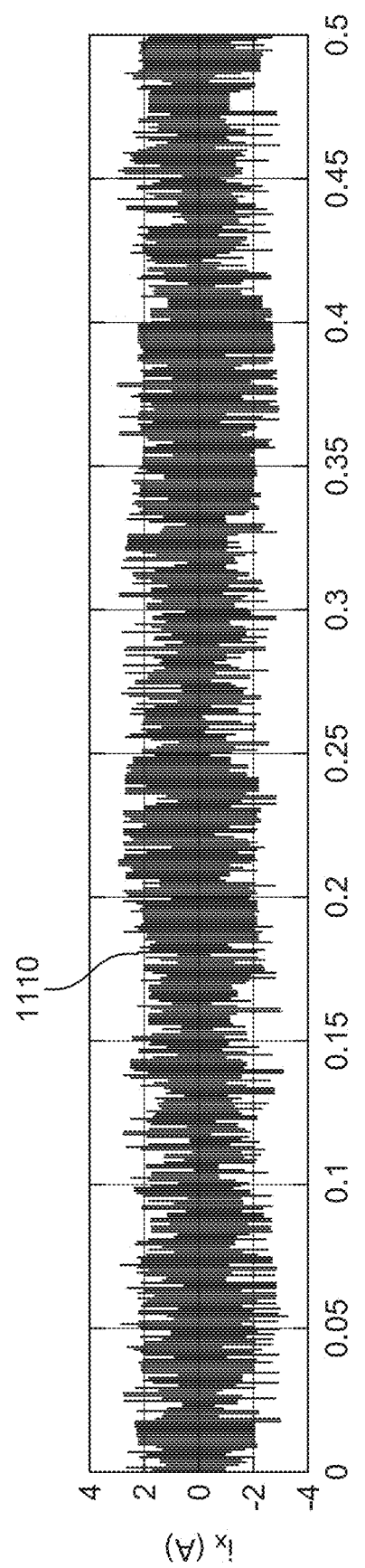
FIG. 11C illustrates a steady state response of the electric drive system for the conventional predictive current control (PCC) method using 13 voltage vectors for subspace currents $i_x$, according to certain embodiments.

FIG. 11C illustrates a steady state response of the electric drive system 100 for conventional method using 13 voltage vectors for subspace currents $i_x$, according to an embodiment. A fifty-seventh plot 1110 indicates a pattern of subspace current $i_x$, through the 6PIM 102 with respect to time.

Figure 11D:
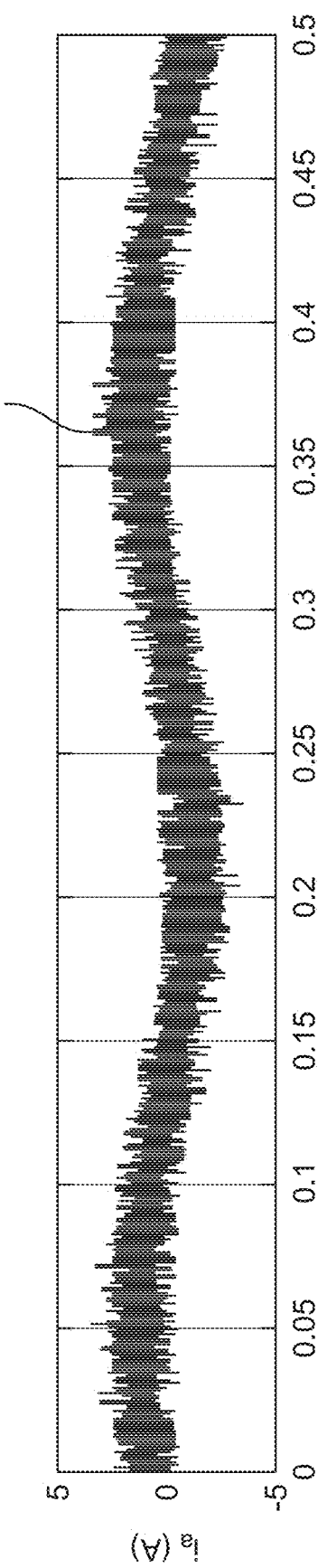
FIG. 11D illustrates a steady state response of the electric drive system for the conventional predictive current control (PCC) method using 13 voltage vectors for phase currents $i_a$, according to certain embodiments.

FIG. 11D illustrates a steady state response of the electric drive system 100 for conventional method using 13 voltage vectors for phase currents $i_a$, according to an embodiment. A fifty-eighth plot 1112 indicates a pattern of phase current $i_a$, through the 6PIM 102 with respect to time.

Figure 11E:
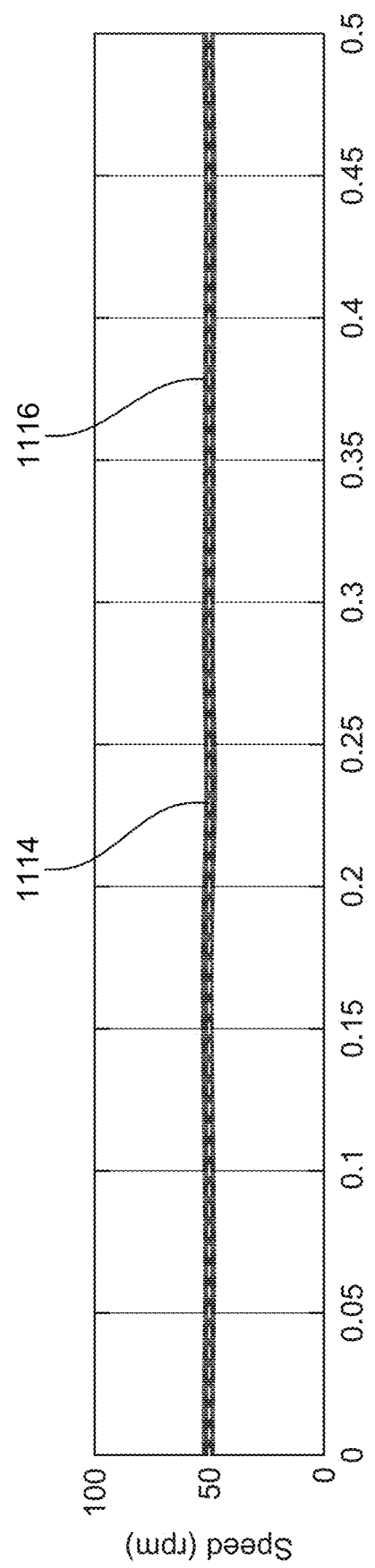
FIG. 11E illustrates a steady state response of the electric drive system using a predictive current control (PCC)-deadbeat method for rotation speed, according to certain embodiments.

FIG. 11E illustrates a steady state response of the electric drive system 100 using a PCC-deadbeat method for rotation speed, according to an embodiment. A fifty-ninth plot 1114 indicates a rotation speed of the 6PIM 102 with respect to time. A sixtieth plot 1116 indicates a reference rotor speed $\omega_r^*$.

Figure 11F:
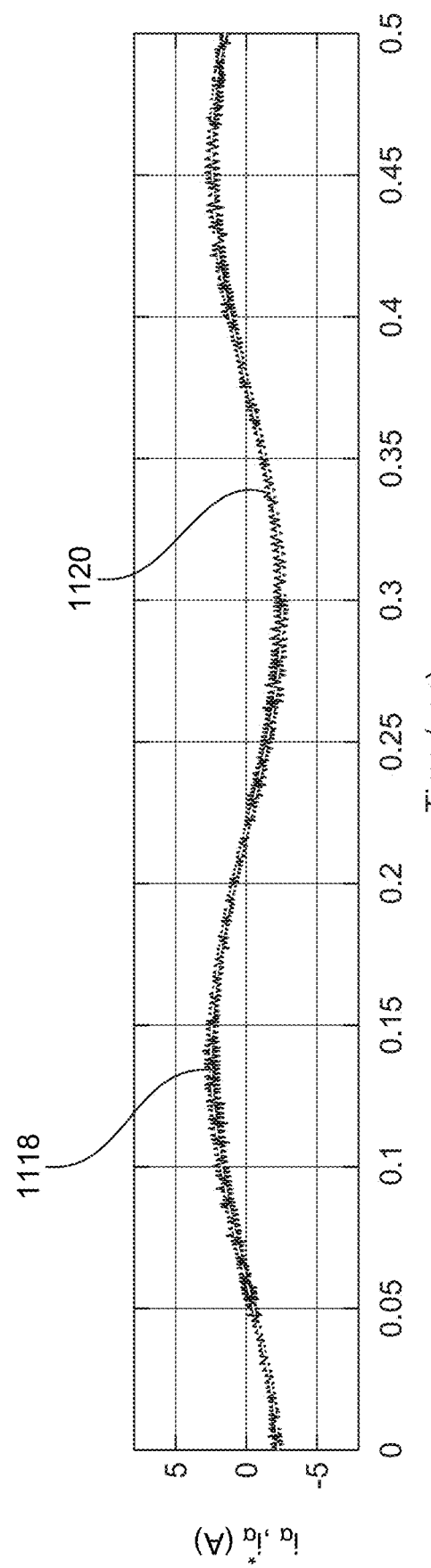
FIG. 11F illustrates a steady state response of the electric drive system using a predictive current control (PCC)-deadbeat method for subspace currents $i_\alpha$, according to certain embodiments.

FIG. 11F illustrates a steady state response of the electric drive system 100 using a PCC-deadbeat method for subspace currents $i_\alpha$, according to an embodiment. A sixty-first plot 1118 indicates a pattern of subspace current $i_\alpha$, through the 6PIM 102 with respect to time. A sixty-second plot 1120 indicates a reference subspace current $i_\alpha$.

Figure 11G:
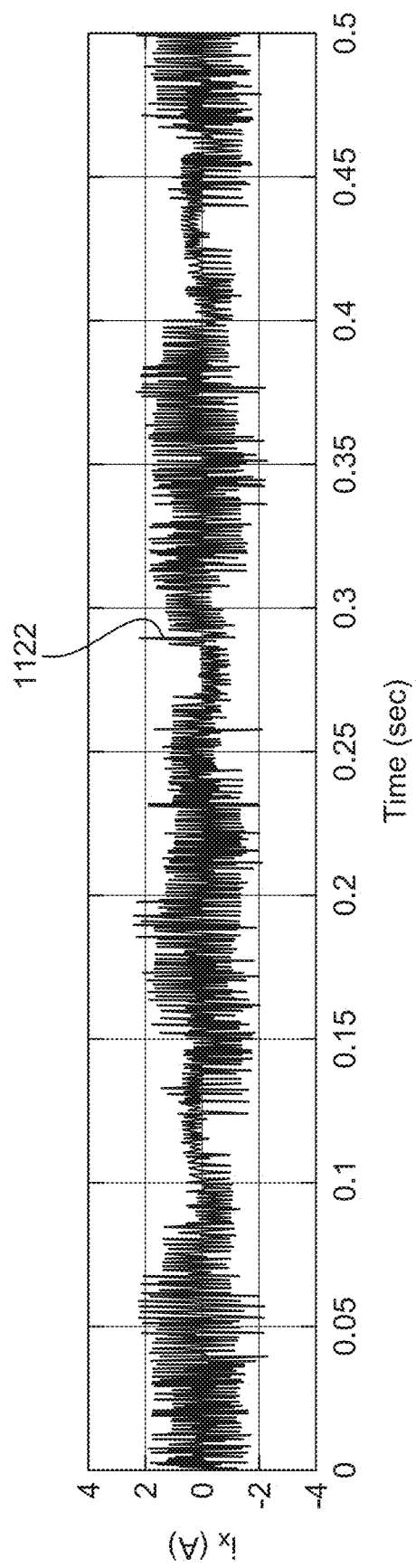
FIG. 11G illustrates a steady state response of the electric drive system using a predictive current control (PCC)-deadbeat method for subspace currents $i_x$, according to an embodiment.

FIG. 11G illustrates a steady state response of the electric drive system 100 using a PCC-deadbeat method for subspace currents $i_x$, according to an embodiment. A sixty-third plot 1122 indicates a pattern of subspace current $i_x$, through the 6PIM 102 with respect to time.

Figure 11H:
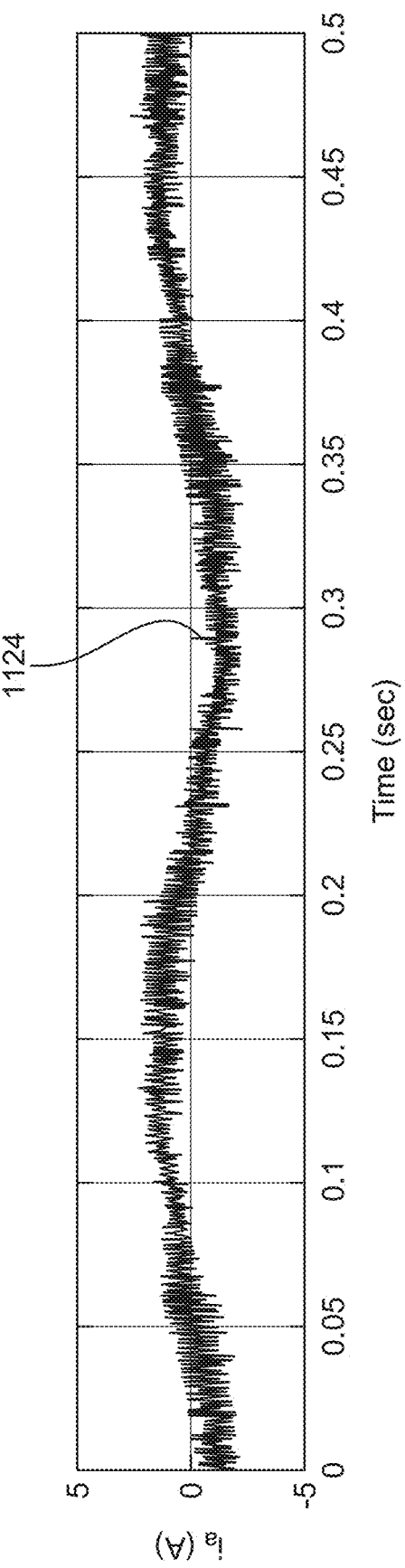
FIG. 11H illustrates a steady state response of the electric drive system using a predictive current control (PCC)-deadbeat method for subspace phase currents $i_a$, according to certain embodiments.

FIG. 11H illustrates a steady state response of the electric drive system 100 using a PCC-deadbeat method for subspace phase currents $i_a$, according to an embodiment. A sixty-fourth plot 1124 indicates a pattern of phase current $i_a$, through the 6PIM 102 with respect to time.

Figure 11I:
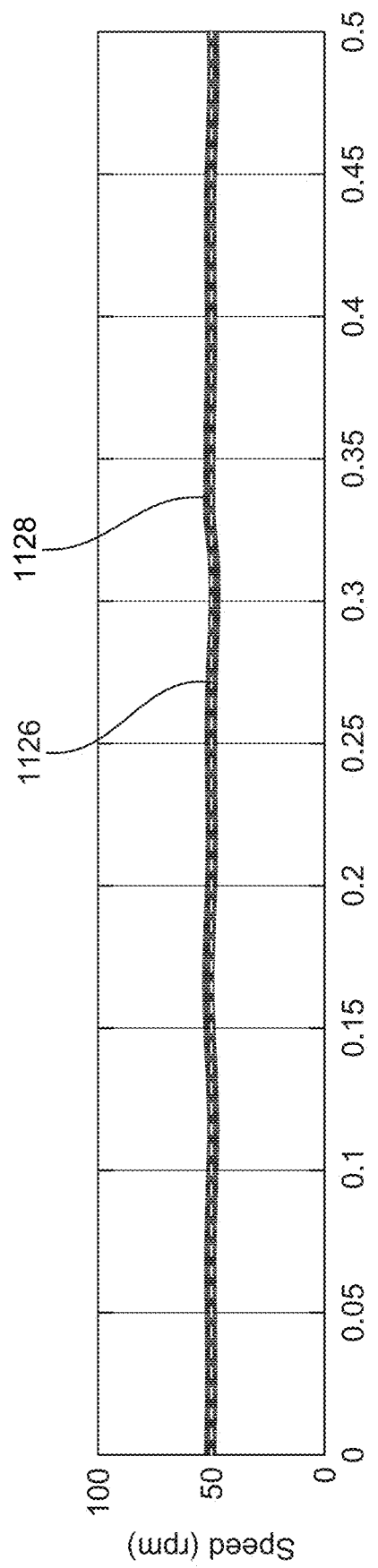
FIG. 11I illustrates a steady state response of the electric drive system for a proposed predictive current control (PCC) method for rotation speed, according to certain embodiments.

FIG. 11I illustrates a steady state response of the electric drive system 100 for a proposed PCC method for rotation speed, according to an embodiment. A sixth-fifth plot 1126 indicates a rotation speed of the 6PIM 102 with respect to time. A sixty-sixth plot 1128 indicates a reference rotor speed $\omega_r^*$.

Figure 11J:
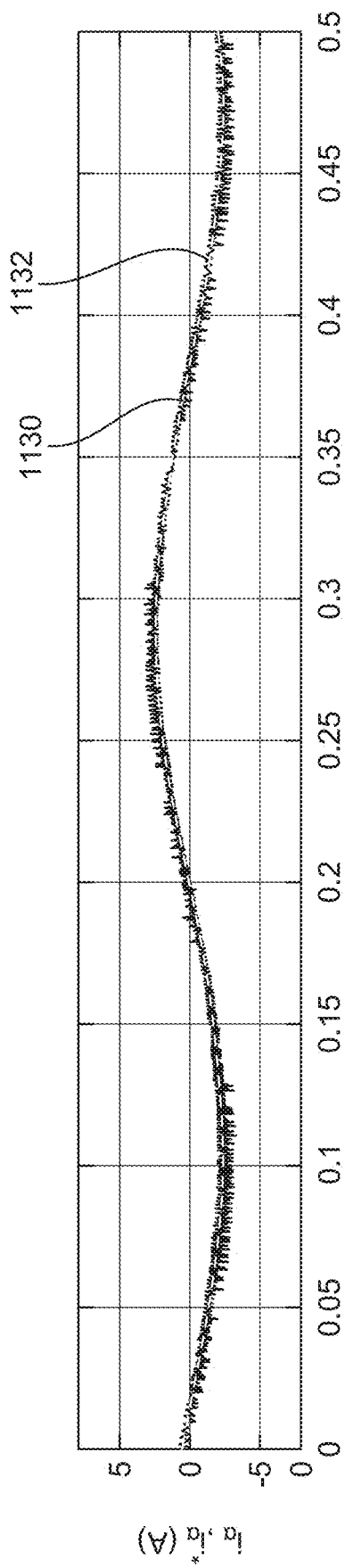
FIG. 11J illustrates a steady state response of the electric drive system for a proposed predictive current control (PCC) method for subspace currents $i_\alpha$, according to certain embodiments.

FIG. 11J illustrates a steady state response of the electric drive system 100 for a proposed PCC method for subspace currents $i_\alpha$, according to an embodiment. A sixty-seventh plot 1130 indicates a pattern of subspace current $i_\alpha$, through the 6PIM 102 with respect to time. A sixty-eighth plot 1132 indicates a reference subspace current $i_\alpha$.

Figure 11K:
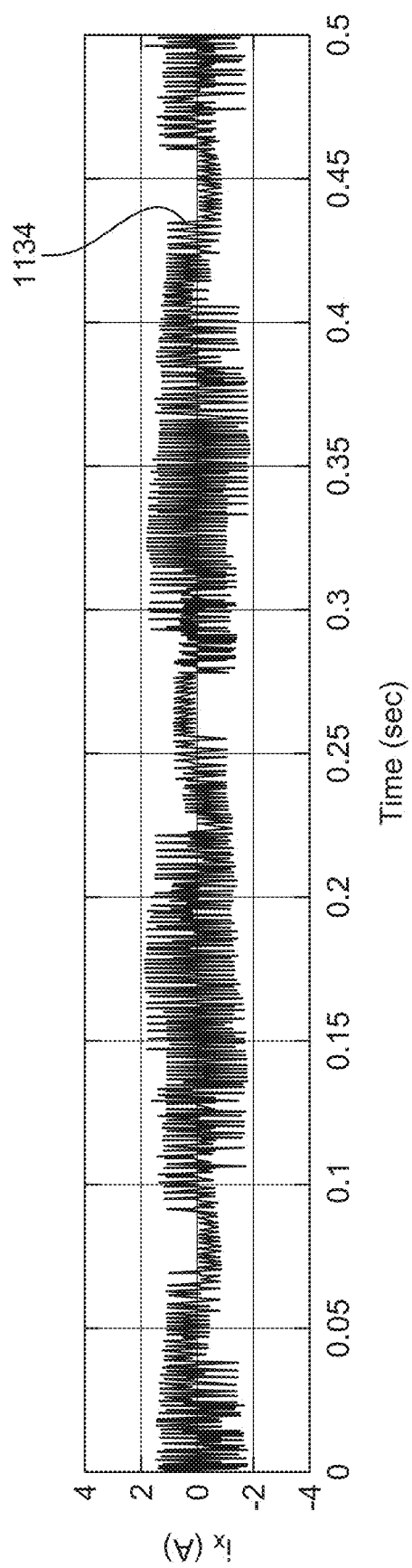
FIG. 11K illustrates a steady state response of the electric drive system for a predictive current control (PCC) method for subspace currents $i_x$, according to certain embodiments.

FIG. 11K illustrates a steady state response of the electric drive system 100 for a proposed PCC method for subspace currents $i_x$, according to an embodiment. A sixty-ninth plot 1134 indicates a pattern of subspace current $i_x$, through the 6PIM 102 with respect to time.

Figure 11L:
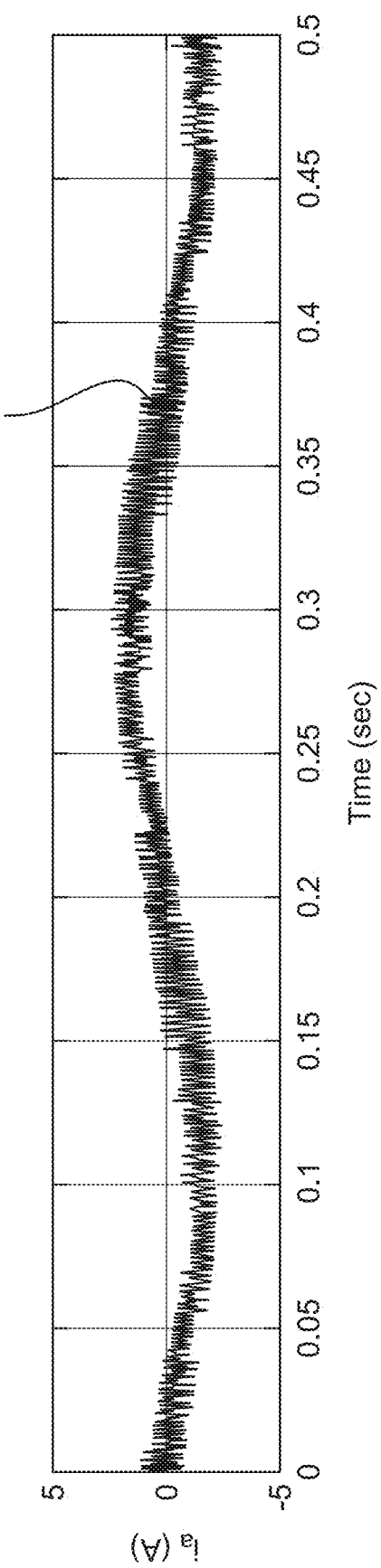
FIG. 11L illustrates a steady state response of the electric drive system for a predictive current control (PCC) method for subspace phase currents $i_a$, according to certain embodiments.

FIG. 11L illustrates a steady state response of the electric drive system 100 for a proposed PCC method for subspace phase currents $i_a$, according to an embodiment. A seventieth plot 1136 indicates a pattern of phase current $i_a$, through the 6PIM 102 with respect to time.

Considering FIG. 11A-11L, the performance of the conventional, the deadbeat (PCC-DB) based method and the proposed PCC methods were investigated at steady state under different operating points. It was observed that both the PCC-DB and proposed methods tracks successfully speed and current references along with reducing the circulating current significantly compared to the conventional method. Also, the PCC-DB method results in the lowest current THD with some sacrifice with higher switching frequency.

Figure 12A:
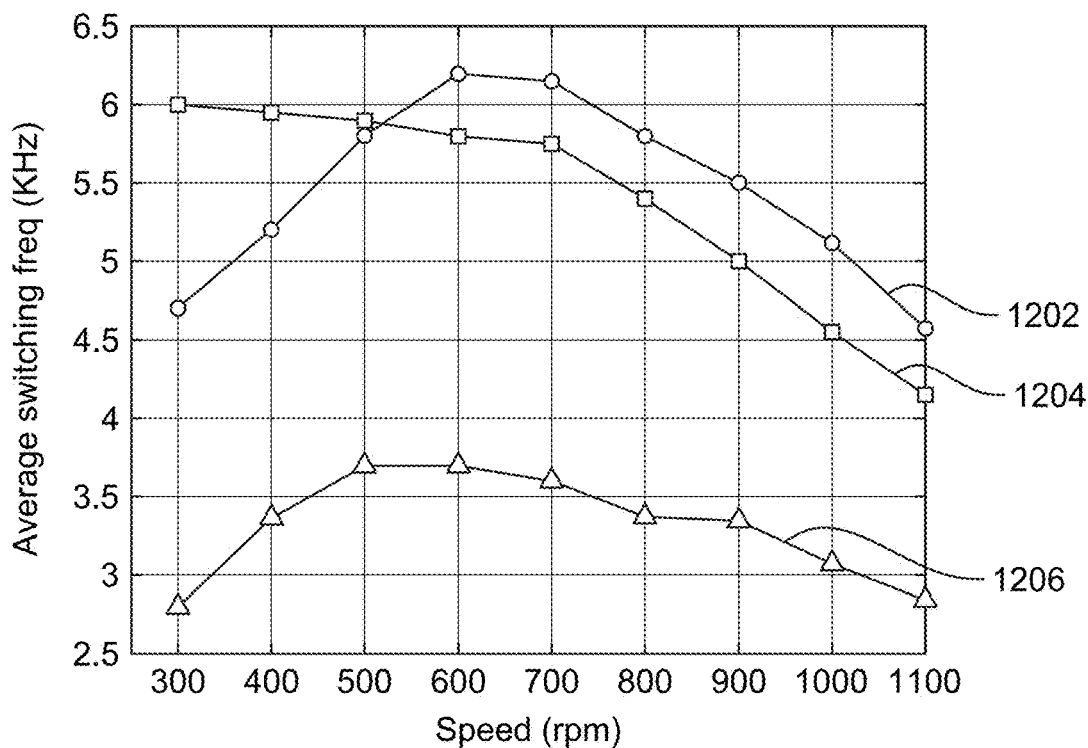
FIG. 12A illustrates a variation pattern of average switching frequency at different speeds and 2.5 Nm, according to certain embodiments.

FIG. 12A illustrates variation pattern of average switching frequency at different speed and 2.5 Nm, according to an embodiment. A seventy-first plot 1204 shows a variation in switching frequency for convention method whereas a seventy-second plot 1202 and a seventy-third plot 1206 shows variation in switching frequency for PCC-DB based method and the proposed PCC method, respectively. It is observed that the proposed PCC method is superior from the average switching frequency viewpoint since it utilizes the redundant four zero VVs and limits the maximum switching state change to one time at maximum per sample time. Thus, considerable reduction of about 50% of the average switching frequency was achieved compared to the conventional method. The same is also shown in Table 5. It is to be noted that a 15% reduction in current total harmonic distortion is also achieved using the proposed PCC method.

TABLE 5

Performance comparison between PCC methods

| O.P. | Method | $e_\alpha^{RMS}$(A) | $e_x^{RMS}$(A) | $i_{THD}$ % | $f_{av}$(kHz) |
|---|---|---|---|---|---|
| 300 rpm | Conv | 0.35 | 1.18 | 43.2 | 6.0 |
| 2 Nm | PCC-DB | 0.19 | 0.76 | 27.7 | 4.45 |
|  | Proposed | 0.27 | 0.76 | 27.5 | 2.7 |
| 600 rpm | Conv | 0.37 | 1.13 | 33.3 | 5.9 |
| 3 Nm | PCC-DB | 0.18 | 0.80 | 23.3 | 6.25 |
|  | Proposed | 0.26 | 0.82 | 23.4 | 3.8 |
| 1100 rpm | Conv | 0.45 | 1.10 | 25.6 | 4.1 |
| 4 Nm | PCC-DB | 0.20 | 0.86 | 20.5 | 3.47 |
|  | Proposed | 0.37 | 1.06 | 23.7 | 2.1 |

Figure 12B:
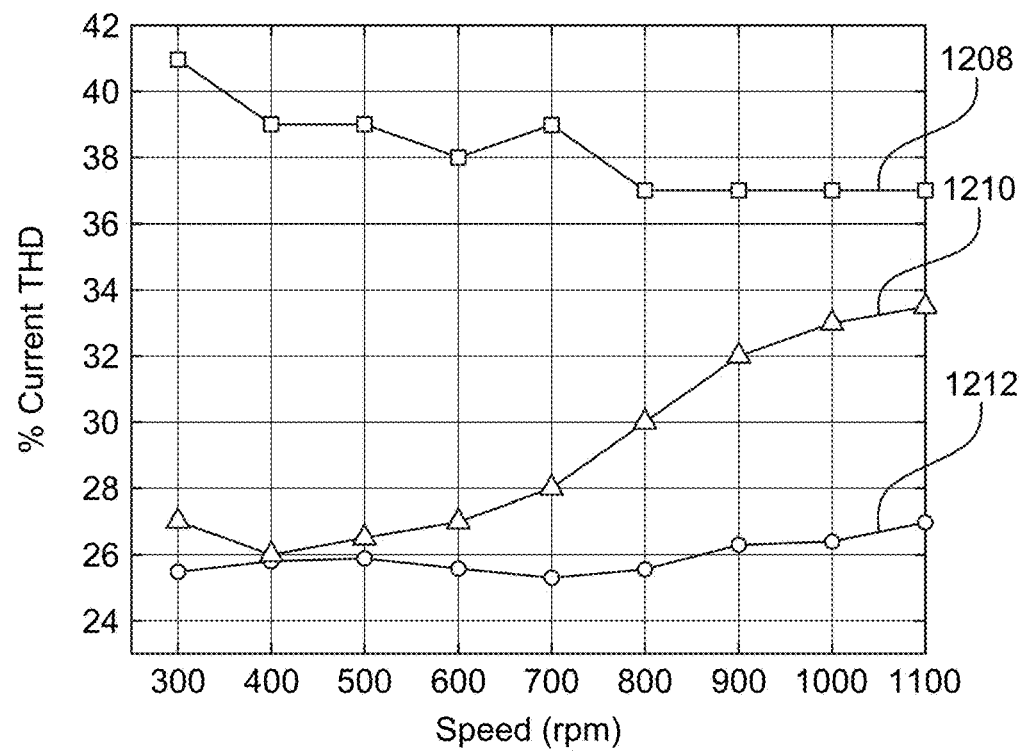
FIG. 12B illustrates a variation pattern of current THD at different speeds and 2.5 Nm load, according to certain embodiments.

FIG. 12B illustrates variation pattern of current THD at different speed and 2.5 Nm load, according to an embodiment. A seventy-fourth plot 1208 shows a variation pattern of current THD for convention method whereas a seventy-fifth plot 1212 and a seventy-sixth plot 1210 shows variation in switching frequency for PCC-DB based method and the proposed PCC method, respectively. The relatively high values for current THD of all methods were observed that may be due to the small value of machine leakage reactance which results in high circulating currents or xy components.

In conclusion of all results as observed in FIGS. 7-12 during the experimental tests over the drive system 100, it was observed that the $e^{RMS}$ for both a and x subspace was calculated at different speed and loading conditions as listed earlier in Table 5. It was also observed that PCC-DB method has the lowest value for RMS errors. The proposed PCC method shows very close values regarding $e_x^{RMS}$ but a little higher value of $e_\alpha^{RMS}$ compared to the PCC-DB method. It was also evident that the proposed PCC method has the lowest average switching frequency.

TABLE 6

Execution times for different PCC methods

| Method | Pred &opt (µsec) | Total (µsec) |
|---|---|---|
| Conventional | 1.31 | 14.2 |
| PCC-DB | 4.68 | 17.9 |
| Proposed | 0.92 | 13.8 |

Also, the average execution time of convention method, PCC-DB and the proposed PCC method is shown in Table 6. From Table 6, it is to be noted that the proposed PCC method shows the shortest execution time. Further, the percentage reduction in execution time was not proportional to the reduction of iterations number, as all three algorithms were optimized to reduce the computation burden. Further the constant terms in the predicted variables in the proposed PCC method could be calculated only one time, while the computation of VV dependent term (BU(k+1)) along with the cost function were repeated as many times as the admissible VVs of each method. This shows a considerably reduction in the computation burden for all methods.

Figure 13:
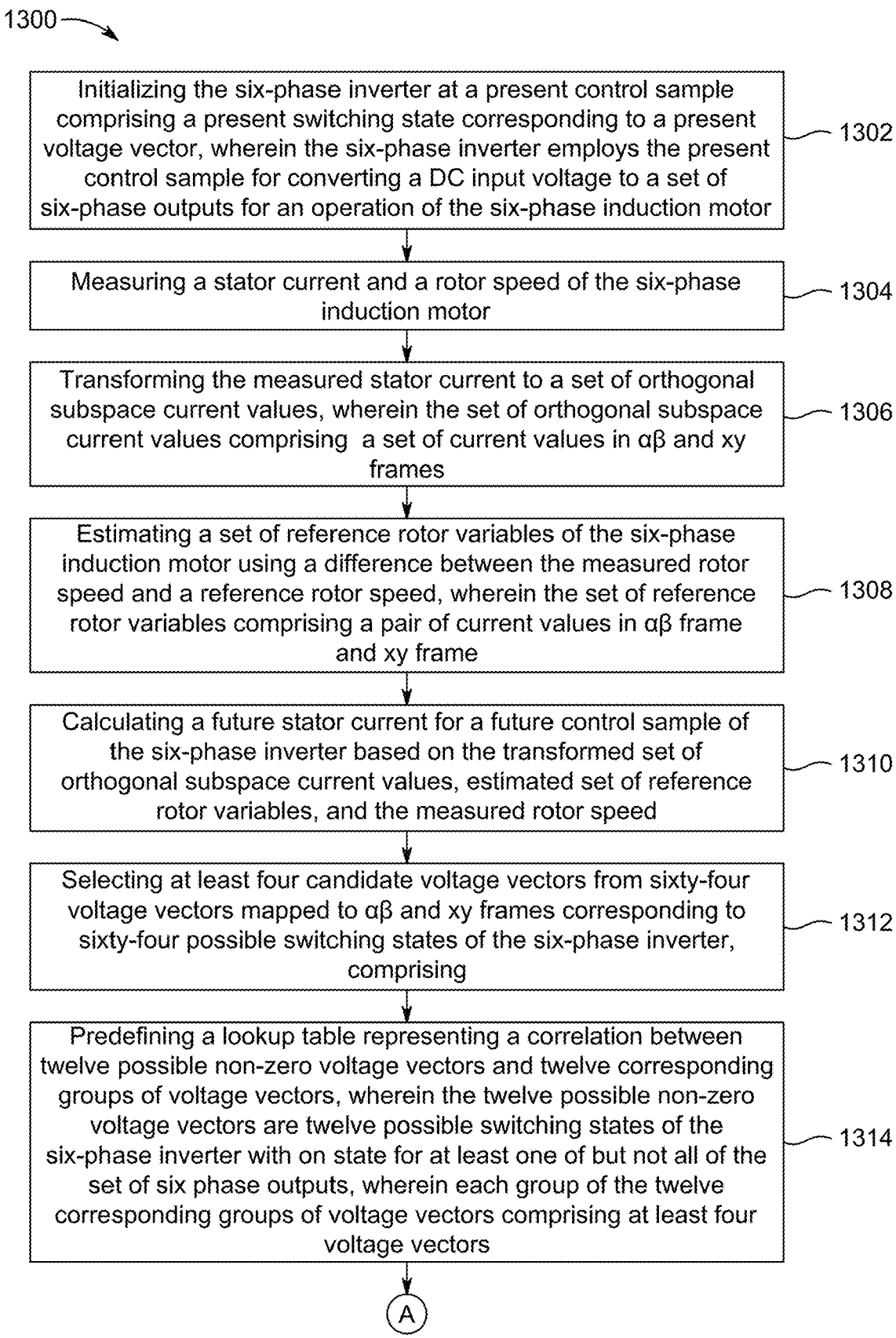
FIG. 13 illustrates a flowchart of a predictive current control method for a six-phase induction motor driven by a six-phase inverter, according to certain embodiments.
Figure 13:
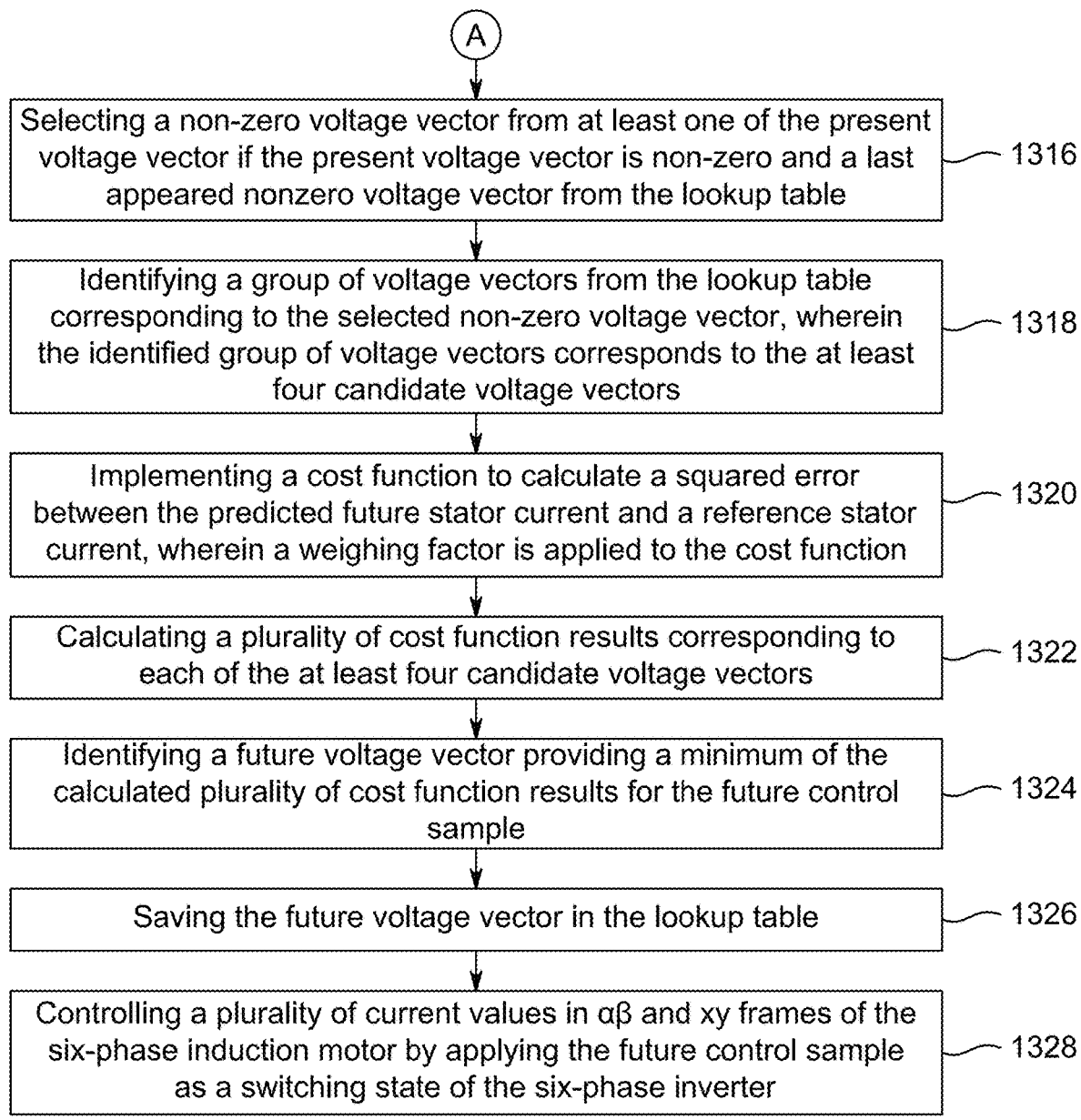

FIG. 13 illustrates a flowchart of a method 1300 for predictive current control of a six-phase induction motor driven by a six-phase inverter, according to an embodiment. The method 1300 is described in conjunction with FIGS. 1-4 and plurality of experimental observation depicted in FIGS. 5-12. Various steps of the method 1300 are included through blocks in FIG. 13. One or more blocks may be combined or eliminated to achieve predictive current control method for six-phase induction motor 102 driven by six-phase inverter 104, without departing from the scope of the present disclosure.

At step 1302, the method 1300 includes initializing the six-phase inverter 104 at a present control sample comprising a present switching state corresponding to a present voltage vector (VV). The six-phase inverter 104 is further configured to employ the present control sample for converting a DC input voltage to a set of six-phase outputs for an operation of the six-phase induction motor 102.

At step 1304, the method 1300 includes measuring a stator current $i_s$ and a rotor speed @r of the six-phase induction motor 102. The stator current $i_s$ may be measured using a current sensor 132 attached at the output of the 6-phase inverter 104. The rotor speed $\omega_r$ may be measured by an encoder 114 coupled with the 6PIM 102.

At step 1306, the method 1300 includes transforming the measured stator current $i_s$ to a set of orthogonal subspace current values. The set of orthogonal subspace current values comprises a set of current values in αβ and xy frames. In an embodiment, the stator current $i_s$ is transformed into αβ and xy frames or subspace using the first transformation block 130. The first transformation block 130 is coupled at the output of the 2L-6phase inverter 104.

At step 1308, the method 1300 includes estimating a set of rotor variables iq* and id* of the six-phase induction motor 102 using a difference between the measured rotor speed $\omega_r$ and a reference rotor speed $\omega_r$*. The set of rotor variables comprises a pair of current values in αβ frame and xy frame. In an embodiment, the set of rotor variables iq* and id* are transformed into αβ frame and xy frame using the second transformation block 124. The second transformation block 124 is coupled at the output of the PI controller 116. An input of the PI controller 116 is coupled at the output of the difference circuit configured to compute difference between the measured rotor speed $\omega_r$ and a reference rotor speed $\omega_r$*.

At step 1310, the method 1300 includes calculating a future stator current for a future control sample of the six-phase inverter 104 based on the transformed set of orthogonal subspace current values, estimated set of rotor variables, and the measured rotor speed.

At step 1312, the method 1300 includes selecting four candidate voltage vectors (Vg) from sixty-four voltage vectors mapped to αβ and xy frames corresponding to sixty-four possible switching states of the six-phase inverter. The step 1312 further comprises a step 1314, 1316 and 1318 sequentially.

At step 1314, the method 1300 includes predefining a lookup table 126 representing a correlation between twelve possible non-zero voltage vectors and twelve corresponding groups of voltage vectors. The twelve possible non-zero voltage vectors are twelve possible switching states of the six-phase inverter 104 with on state for at least one of but not all of the set of six phase outputs. Each group of the twelve corresponding groups of voltage vectors comprising four voltage vectors.

At step 1316, the method 1300 includes selecting a non-zero voltage vector ($V_{old}$ or $V_{NZ}$) from at least one of, (1) the present voltage vector if the present voltage vector is non-zero or (2) a last appeared nonzero voltage vector from the lookup table 126.

At step 1318, the method 1300 includes identifying a group of voltage vectors ($V_g$) from the lookup table 126 corresponding to the selected non-zero voltage vector. The identified group of voltage vectors corresponds to the four candidate voltage vectors.

At step 1320, the method 1300 includes implementing a cost function g($V_s$) to calculate a squared error between the predicted future stator current and a reference stator current. A weighing factor is applied to the cost function. In an embodiment, weighing factor is selected from a range of 0.01 up to 0.2 that corresponds to control a current in xy orthogonal subspace.

At step 1322, the method 1300 includes calculating a plurality of cost function results corresponding to each of the four candidate voltage vectors ($V_g$).

At step 1324, the method 1300 includes identifying a future voltage vector providing a minimum of the calculated plurality of cost function results for the future control sample.

At step 1326, the method 1300 includes saving the future voltage vector as an optimal voltage vector to be used as an input to the lookup table 126 for the next control sample.

At step 1328, the method 1300 includes controlling a plurality of current values in αβ and xy frames of the six-phase induction motor 102 by applying the future control sample as a switching state of the six-phase inverter 104.

Based upon the method of controlling the six-phase induction motor driven by the six-phase inverter followed by a plurality of experimental observations, a simple PCC algorithm for asynchronous six-phase induction motors is proposed. The predictive current control method requires only four VVs to be evaluated during each control sample. Not only the computation cost is reduced but also a considerable reduction of the average switching frequency is achieved. The performance of the proposed PCC method has been investigated at different operating conditions and compared to the conventional method and deadbeat-based PCC method. The proposed method has the lowest average switching frequency with a reduction of about 50% as compared to conventional methods. Compared to the conventional method, the proposed PCC method has considerable reduction in current THD of about 15%, specially at low and medium speed ranges. The current tracking for the proposed PCC method is superior to the conventional one as indicated by the less tracking errors both in αβ and xy subspaces. There are extra calculations involved in the conventional methods that overburden the cost function calculation, especially in the PCC-DB method that is overcome with the proposed PCC method. Further, the execution time required for implementation is shortest for the proposed PCC method. The reduced number of iterations required for the implementation of the proposed PCC method makes it possible for utilizing longer prediction horizon predictive controllers for multi-phase machines.

Numerous modifications and variations of the present disclosure are possible in light of the above teachings. For example, relatively high values for current THD of all methods were observed in the three methods during experiment. The high value may be due to the small value of machine leakage reactance which results in high circulating currents (xy components). It is therefore to be understood that within the scope of the appended claims, the invention may be practiced otherwise than as specifically described herein.

The invention claimed is:

1. A predictive current control method for a six-phase induction motor driven by a six-phase inverter, comprising:
   initializing the six-phase inverter at a present control sample comprising a present switching state corresponding to a present voltage vector, wherein the six-phase inverter employs the present control sample for converting a DC input voltage to a set of six-phase outputs for an operation of the six-phase induction motor;
   measuring a stator current and a rotor speed of the six-phase induction motor;
   transforming the measured stator current to a set of orthogonal subspace current values, wherein the set of orthogonal subspace current values comprising a set of current values in αβ and xy frames;
   estimating a set of rotor variables of the six-phase induction motor using a difference between the measured rotor speed and a reference rotor speed, wherein the set of rotor variables comprising a pair of current values in αβ frame and xy frame;
   calculating a future stator current for a future control sample of the six-phase inverter based on the transformed set of orthogonal subspace current values, estimated set of rotor variables, and the measured rotor speed;

selecting four candidate voltage vectors from sixty-four voltage vectors mapped to αβ and xy frames corresponding to sixty-four possible switching states of the six-phase inverter, comprising:

predefining a lookup table representing a correlation between twelve possible non-zero voltage vectors and twelve corresponding groups of voltage vectors, wherein the twelve possible non-zero voltage vectors are twelve possible switching states of the six-phase inverter with on state for at least one of but not all of the set of six phase outputs, wherein each group of the twelve corresponding groups of voltage vectors comprising four voltage vectors;

selecting a non-zero voltage vector from at least one of the present voltage vector if the present voltage vector is non-zero and a last appeared nonzero voltage vector from the lookup table; and identifying a group of voltage vectors from the lookup table corresponding to the selected non-zero voltage vector, wherein the identified group of voltage vectors corresponds to the four candidate voltage vectors;

implementing a cost function to calculate a squared error between the predicted future stator current and a reference stator current, wherein a weighing factor is applied to the cost function;

calculating a plurality of cost function results corresponding to each of the four candidate voltage vectors;

identifying a future voltage vector providing a minimum of the calculated plurality of cost function results for the future control sample;

saving the future voltage vector as an input to the lookup table for a successive control sample; and controlling a plurality of current values in αβ and xy frames of the six-phase induction motor by applying the future control sample as a switching state of the six-phase inverter.

2. The predictive current control method of claim 1, wherein the future control sample comprises at least two future control samples corresponding to the present control sample.

3. The predictive current control method of claim 1, further comprising identifying a control sample with up to one commutation of a set of switches of the six-phase inverter.

4. The predictive current control method of claim 1, wherein mapping of a plurality of most significant voltage vectors in αβ orthogonal subspace is corresponding to mapping of a plurality of lowest voltage vectors in xy orthogonal subspace.

5. The predictive current control method of claim 1, wherein the applied weighing factor corresponds to controlling a current in xy orthogonal subspace.

6. The predictive current control method of claim 1, wherein the weighing factor is a value selected from a range of 0.01 up to 0.2.

7. The predictive current control method of claim 1, wherein the twelve possible switching states of the six-phase inverter correspond to twelve largest voltage vectors in αβ orthogonal subspace.

8. The predictive current control method of claim 1, wherein the four candidate voltage vectors comprise three active voltage vectors and one zero voltage vector.

9. The predictive current control method of claim 8, wherein the three active voltage vectors correspond to three consecutive switching states of the six-phase inverter.

10. The predictive current control method of claim 8, wherein the one zero voltage vector is selected from four zero voltage vectors corresponding to four zero switching states of the six-phase inverter.

11. The predictive current control method of claim 1, wherein the six-phase inverter comprises two three-phase two level-voltage source inverters (2L-VSI) connected in parallel.

12. The predictive current control method of claim 1, wherein the measuring of the rotor speed of the six-phase induction motor utilizing an encoder coupled to the six-phase induction motor.

13. The predictive current control method of claim 1, wherein the estimating of the set of rotor variables utilizing a proportional-integral controller.

14. The predictive current control method of claim 1, performed utilizing a computer processor.

* * * * *